United States Patent
Matsumoto et al.

(10) Patent No.: US 6,533,558 B1
(45) Date of Patent: Mar. 18, 2003

(54) CLOSED ROTARY COMPRESSOR

(75) Inventors: Kenzo Matsumoto, Gunma (JP); Manabu Takenaka, Gunma (JP); Tsuyoshi Higuchi, Gunma (JP); Kazuaki Fujiwara, Gunma (JP); Dai Matsuura, Gunma (JP); Aritomo Sato, Saitama (JP); Akira Hashimoto, Gunma (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/605,960

(22) Filed: Jun. 28, 2000

(30) Foreign Application Priority Data

Jun. 29, 1999 (JP) .......................................... 11-183645
Jun. 29, 1999 (JP) .......................................... 11-183661

(51) Int. Cl.$^7$ .............................................. F04B 35/04
(52) U.S. Cl. ...................... 417/410.3; 417/368; 417/902
(58) Field of Search .............................. 417/463, 410.3, 417/410.4, 902, 350, 371, 210, 368

(56) References Cited

U.S. PATENT DOCUMENTS

| | | | | |
|---|---|---|---|---|
| 5,986,377 A | * | 11/1999 | Yamada et al. | 310/216 |
| 6,075,304 A | * | 6/2000 | Nakatsuka | 310/216 |
| 6,102,677 A | * | 8/2000 | Iida et al. | 417/463 |

* cited by examiner

Primary Examiner—Charles G. Freay
(74) Attorney, Agent, or Firm—Darby & Darby

(57) ABSTRACT

An object of the present invention is to attain the downsizing of a closed rotary compressor while realizing separation of oil from gas without any problem, and since an electric motor is constituted by a motor of a magnetic pole concentrated winding type which includes: a stator fixed to the inner wall of a closed container; a rotator rotatably supported by a rotating shaft on the inner side of said stator; a stator core constituting said stator; a plurality of cog portions and slot portions formed to said stator core; and a stator winding directly wound around each cog portion utilizing the slot portions, a protrusion dimension of the winding from the stator core is reduced, and the excellent oil separation effect can be obtained.

12 Claims, 23 Drawing Sheets

FIG.8

| MOTOR | AC MOTOR | DC BRUSHLESS MOTOR | PRESENT INVENTION | | | | | | |
|---|---|---|---|---|---|---|---|---|---|
| OVERALL HEIGHT L (%) | 100 | 94 | 100 | 94 | 85 | 77 | 77 | 77 | 77 |
| L1/(L1+L2) | 0.24 | 0.27 | 0.6 | 0.52 | 0.43 | 0.3 | 0.3 | 0.3 | 0.3 |
| OIL DISCHARGE QUANTITY (%) | 100 | 90 | 8 | 10 | 40 | 100 | 90 | 70 | 50 |
| RATIO (%) | 3.8 | 3.8 | 5.5 | 5.5 | 5.5 | 3.5 | 3.8 | 4.5 | 5.5 |

CLOSED ROTARY COMPRESSOR

BACKGROUND OF THE INVENTION

1. Field of the Invention

The present invention relates to a closed rotary compressor mounted in, for example, an air conditioner or a freezing machine.

2. Description of the Prior Art

This kind of conventional closed rotary compressor 100 will be explained with reference to FIGS. 14 to 16. In each drawing, reference numeral 101 denotes a closed container in which an electric motor (for example, a DC brushless motor) 102 as an electric element is provided on the upper side and a compression element 103 driven to rotate by the electric motor 102 is accommodated on the lower side. The closed container 101 has a half-split structure composed of a cylindrical shell portion 101A whose upper end is opened and an end cap portion 101B whose upper end opening is closed above the shell portion 101A, and it is constituted by fitting the end cap portion 101B on the shell portion 101A to be closed by high frequency deposition and the like after accommodating the electric motor 102 and the compression element 103 in the shell portion 101A. Further, the bottom portion in the shell portion 101A of the closed container 101 is an oil bank B.

The electric motor 102 is constituted by a stator 104 fixed on the inner wall of the closed container 101, and & rotator 105 supported so as to be rotatable around a rotating shaft 106 inside the stator 104. The stator 104 is constituted by a stator core 174 configured by superimposing a plurality of stator iron plates having a substantially donut-like shape, and a stator winding (driving coil) 107 for giving a rotating magnetic field to the rotator 105 attached to a plurality of cog portions 175 formed on the internal periphery of the stator core 174 by the distributed winding method. The outer peripheral surface of the stator core 174 is brought into contact with and fixed to the inner wall of the shell portion 101A of the closed container 101.

In this case, a plurality of notches 176 are formed on the outer peripheral surface of the stator core 174, and the notch 176 is estranged from the inner wall of the shell portion 101A so that a passage 177 is formed in that space.

The compression element 103 includes a first rotary cylinder 109 and a second rotary cylinder 101 separated by an intermediate partition plate 108. Eccentric portions 111 and 112 driven to rotate by the rotating shaft 106 are attached to the respective cylinders 109 and 110, and the phases of these eccentric portions 111 and 112 are shifted from each other 180 degrees at the eccentric positions.

Reference numerals 113 and 114 designate a first roller and a second roller which rotate in the cylinders 109 and 110 respectively and turn in the cylinders by rotation of the eccentric portions 111 and 112. Reference numerals 115 and 116 denote first frame body and a second frame body, and the first frame body 115 forms a closed compression space for the cylinder 109 between itself and the partition plate 108 while the second frame body 116 similarly forms a closed compression space for the cylinder 110 between itself and the partition plate 108. Further, the first frame body 115 and the second frame body 116 respectively include bearing portions 117 and 118 which rotatably pivot the lower portion of the rotating shaft 106.

Reference numerals 119 and 120 represent cup mufflers which are disposed so as to cover the first frame body 115 and the second frame body 116, respectively. It is to be noted that the cylinder 109 communicates with the cup muffler 119 via a non-illustrated communication hole formed to the first frame body 115, and the cylinder 110 also communicates with the cup muffler 120 via a non-illustrated communication hole formed to the second frame body 116. Reference numeral 121 denotes a bypass pipe provided outside the closed container 101 to communicate with the inside of the cup muffler 120.

Reference numeral 122 denotes a discharge pipe provided above the closed container 101, and reference numerals 123 and 124 represent suction pipes leading to the cylinders 109 and 110. Moreover, reference numeral 125 designates a closed terminal which supplies power from the outside of the closed container 101 to the stator winding 107 of the stator 104 (a lead wire connecting the closed terminal 125 to the stator winding 107 is not illustrated).

Reference numeral 126 represents a rotator core of the rotator 105 which is obtained by superimposing a plurality of rotator iron plates punched out from an. electromagnetic steel plate having a thickness of 0.3 mm to 0.7 mm in a shape such as shown in FIGS. 15 and 16 and caulking them each other to be integrally layered.

In this case, the rotator iron plate of the rotator core 126 is punched out from the electromagnetic steel plate in such a manner that salient pole portions 128 to 131 constituting four magnetic poles, and reference numerals 132 to 135 represent concave portions provided so that salient pole portions are formed between the respective salient pole portions 128 to 131.

Reference numerals 141 to 144 denote slots into which a magnetic body 145 (a permanent magnet) is inserted. These slots 141 to 144 correspond to the respective salient pole portions 128 to 131 and formed on a concentric circle on the outer peripheral side of the rotator core 126 along the axial direction of the rotating shaft 106.

Further, reference numeral 146 designates a hole which is formed at the center of the rotator core 126 and to which the rotating shaft 106 is shrinkage-fitted.

Reference numerals 147 to 150 denote through holes having a size and a shape with which later-described rivets 151 for caulking are inserted. These through holes 147 to 150 are formed to be associated with the inner sides of the respective slots 141 to 144. Furthermore, reference numerals 161 to 164 represent air holes for forming oil passages formed between the respective through holes 147 to 150. After the multiple respective rotator iron plates are superimposed, they are caulked each other to be integrated, thereby forming the rotator core 126.

On the other hand, the magnetic body 145 is constituted by a rare earth magnet member such as a praseodymium based magnet or a neodymium based magnet whose surface is nickel-plated, and the outward form thereof is a rectangular shape as a whole with a rectangular cross section. The respective slots 141 to 144 have a size allowing insertion of the magnetic body 145 therethrough.

Reference numerals 166 and 167 denote tabular edge members attached to the upper and lower ends of the rotator core 126 and molded into a substantially discoid shape by using a non-magnetic material such as stainless or brass. Through holes are similarly formed to the edge members 166 and 167 at positions corresponding to the through holes 147 to 150.

It is to be noted that reference numeral 172 represents a discoid oil separation plate attached to the rotator 105 so as to be positioned above the edge member 166 and 173 designates a balance weight disposed between the plate 172 and the edge member 166.

With such a configuration, when the rotator winding 107 of the rotator 104 of the electric motor 102 is energized, the rotating magnetic field is formed to rotate the rotator 105. Rotation of the rotator 105 causes eccentric rotation of the rollers 113 and 114 in the cylinders 109 and 110 through the rotating shaft 106, and an intake gas absorbed from the intake pipes 123 and 124 is compressed.

The compressed high pressure gas is emitted from the cylinder 109 into the cup muffler 119 through the communication hole and discharged from a non-illustrated discharge hole formed to the cup muffler 119 into the closed container 101. On the other hand, the gas is emitted from the cylinder 110 into the cup muffler 120 through the communication hole and further discharged into the closed container 101 via the bypass pipe 121.

The discharged high pressure gas passes a gap in the electric motor 102 to reach the discharge pipe 122 and is discharged outside. On the other hand, although the oil is contained in the gas, this oil is separated by the plate 172 and others before reaching the discharge pipe 122 and directed to the outside by the centrifugal force. Further, it flows down to the oil bank B through the passage 177 and others.

As described above, in the conventional closed rotary compressor 100, since the rotating winding 107 constituting the stator 104 of the electric motor 102 adopts the distributed winding mode, the stator winding 107 relatively largely protrudes from the stator core 174 in the vertical direction as shown in FIG. 14. Therefore, the vertical dimension of the closed container 101 is also enlarged, thereby increasing the overall size of the closed rotary compressor 100.

In addition, since the gas within the stator 104 having the stator winding 107 of the distributed winding type is narrow as shown in FIG. 15, the flow velocity of the gas moving up therethrough becomes high. Moreover, the upper and lower ends of the concave portions 132 to 135 of the rotator 105 are closed by the edge members 166 and 167 or the plate 174, and hence the concave portions 132 to 135 does not contribute to suppression of the gas flow velocity either.

Since the oil is hard to be separated when the gas flow velocity is high, the oil easily flows out from the discharge pipe 122. Additionally, since the stator winding 107 stands up high outside of the plate 172 as shown in FIG. 14, the oil hardly flows to the passage 177 even if the centrifugal force acts, thereby reducing the oil separation effect.

Thus, the large space in the closed container 101 above the stator winding 107 of the stator 104 must be assured as shown in FIG. 14 in the prior art, which also encourages increase in the size of the closed rotary compressor 100.

On the other hand, in order to advance the flowing down of the oil into the oil bank B, an oil return passage 177 must be formed with the sufficient dimension. When a notch 176 is increased in size., however, the contact area between the outer peripheral surface of the stator core 174 and the closed container 101 (shell portion 101A) becomes small, and the strength of a part of the closed container 101 to which the stator core 174 is not in contact is lowered. Therefore, there occurs such a problem as that the closed container 101 is bent toward the inside at the notch 176. Thus, formation of the through hole at the outer peripheral portion of the stator core 174 irrespective of the notch can be considered, but the oil does not smoothly flow down as compared with that flowing on the inner wall of the closed container 101.

SUMMARY OF THE INVENTION

In order to solve the above-described technical problems in the prior art, an object of the present invention is to realize separation of the oil from the gas without any problem while downsizing the closed rotary compressor.

That is, the present invention provides a closed rotary compressor for accommodating in a closed container an electric element, and a rotary compression element driven by a rotating shaft connected to the electric element, wherein the electric element is constituted by a motor of the magnetic pole concentrated winding type comprising: a stator fixed to an inner wall of the closed container; a rotator rotatably supported by the rotating shaft inside the stator; a stator core constituting the stator; a plurality of cog portions and slot portions formed to the stator core; and a stator winding directly wound around the respective cog portions by utilizing the slot portions.

Further, when the rotary compression element is accommodated at a bottom portion in the closed container; the electric element is provided above the rotary compression element; a discharge pipe is attached on an upper wall of the closed container; a distance from the upper end of the stator winding of the electric element to the lower surface of the upper wall of the closed container is assumed as L1; and the vertical dimension of the stator of the electric element is assumed as L2, setting is made within a range of $0.3 \leq L1/(L1+L2) \leq 0.6$.

Furthermore, the rotator includes a rotator core; concave portions formed on the outer peripheral surface of the rotator core in the vertical direction; and edge members attached to the both upper and lower edges of the rotator core, notch portions being formed to the edge members at positions corresponding to the concave portions of the rotator core.

In addition, discharge holes formed to the cup muffler of the rotary compression element are provided, and through holes extending to the both upper and lower ends of the rotator are formed at positions corresponding to the upper part of the discharge hole of the rotator.

Further, a plurality of concave passages extending both upper: and lower ends are formed on the outer peripheral surface of the stator at predetermined intervals, cross sectional shape of each passage is formed so as to be narrow on the outer peripheral side of the stator and wide on the inner side of the same, and the outer peripheral surface of a part other than each passage is brought into contact with the inner wall of the closed container.

Moreover, the closed container is constituted by a shell portion whose one end accommodating the electric element and the rotary compression element therein is opened and an end cap portion for closing the opening of the shell portion and, assuming that a value thickness of the stator core of the stator of the electric element is SH and the distance from the stator core to the edge of the end cap portion is T, setting is made within a range of $0.15<T/SH<0.5$ is set.

In addition, a passage area in the stator is set to be not less than 3.8% of the inside cross sectional area of the closed container.

Further, an area of a clearance in the stator is set to be larger than the area of the passage between the stator and the closed container.

Furthermore, the closed rotary compressor according to the present invention accommodates an electric element and a rotary compression element in a closed container, wherein the rotary compression element comprises: an intermediate partition plate; first and second cylinders provided on both sides of the intermediate partition plate; a rotating shaft which has eccentric portions whose rotating angles are shifted from each other 180 degrees and is extended in the axial direction of the closed container to be connected to the electric element; rollers fitted to the eccentric portions of the rotating shaft to rotate in the cylinders; and bearings for closing openings of the respective cylinders, and the electric element comprises: a stator which has a stator winding and is fixed to the closed container; and a rotor which is supported by the rotating shaft and rotatable on the inner side of the stator, gas emitted from the first cylinder being discharged toward the electric element, gas emitted from the second cylinder being discharged from the circumferential direction of the closed container into a space between the stator winding and the rotary compression element.

Additionally, a bypass pipe for guiding gas emitted from the second cylinder is provided to the outside portion of the closed container.

Further, the electric element includes a stator core constituting the stator; and a plurality of cog portions and slot portions formed to the stator core and is constituted by a motor of a magnetic pole concentrated winding type which directly winds the stator winding around the respective cog portions by utilizing the slot portions.

BRIEF DESCRIPTION OF THE DRAWINGS

FIG. 8 is a view showing the relationship between an overall height of the closed rotary compressor and an oil discharge amount when L1 and L2 in FIG. 1 are changed;

DETAILED DESCRIPTION OF THE PREFERRED EMBODIMENT

Figure 1:
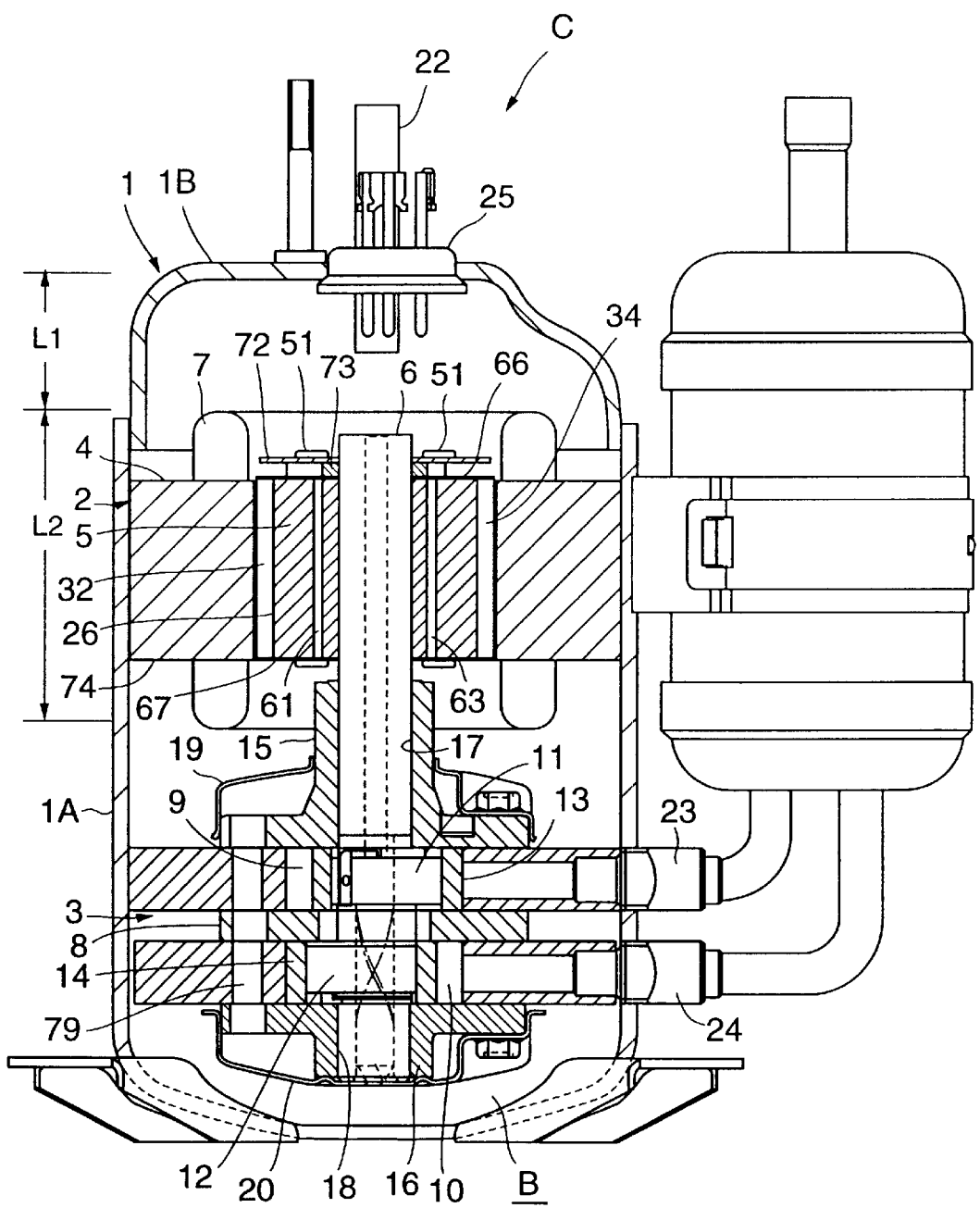
FIG. 1 is a longitudinal side sectional view showing a closed rotary compressor according to one embodiment to which the present invention is applied.

Embodiments according to the present invention will now be described in detail hereinafter with reference to the accompanying drawings. FIG. 1 is a longitudinal side sectional view of a compressor C to which the present invention is applied. In this drawing, reference numeral 1 denotes a closed container in which an electric motor 2 as an electric element is accommodated on the upper side and a compression element 3 driven to rotate by the electric motor 2 is housed on the lower side. The closed container 1 has a half-split structure consisting of a cylindrical shell portion 1A whose upper end is opened and an end cap portion 1B for closing the upper end opening of the shell portion 1A. Further, the closed container 1 is constituted by fitting the end cap portion 1B on the shell portion 1A to be sealed by high frequency deposition and the like after housing the electric motor 2 and the compression element in the shell portion 1A. In addition, a bottom portion in the shell portion 1A of the closed container 1 serves as an oil bank B.

The electric motor 2 is a DC brushless motor of a so-called magnetic pole concentrated winding type and constituted by a stator 4 fixed to an inner wall of the closed container 1 and a rotor 5 rotatably supported around a rotating shaft 6 on the inner side of the stator 4. The stator 4 includes a stator core 74 formed by superimposing a plurality of stator iron plates (silicon steel plates) having a substantially donut-like shape and a stator winding (driving coil) 7 for giving a rotating magnetic field to the rotator 5.

In this case, six cog portions 75 are provided on the inner periphery of the stator core 74, and slot portions 78 opened in the inward and vertical directions are formed between the cog portions 75. Further, a tip portion 75a opened along the outer surface of the rotator 5 is formed at the end of the cog portion 75. When the stator winding 7 is directly wound around the cog portions 75 by utilizing the space of the slot portions 78, the magnetic poles of the stator 4 are formed by a so-called concentrated series winding method, thereby constituting the four-pole-six-slot stator 4.

Figure 2:
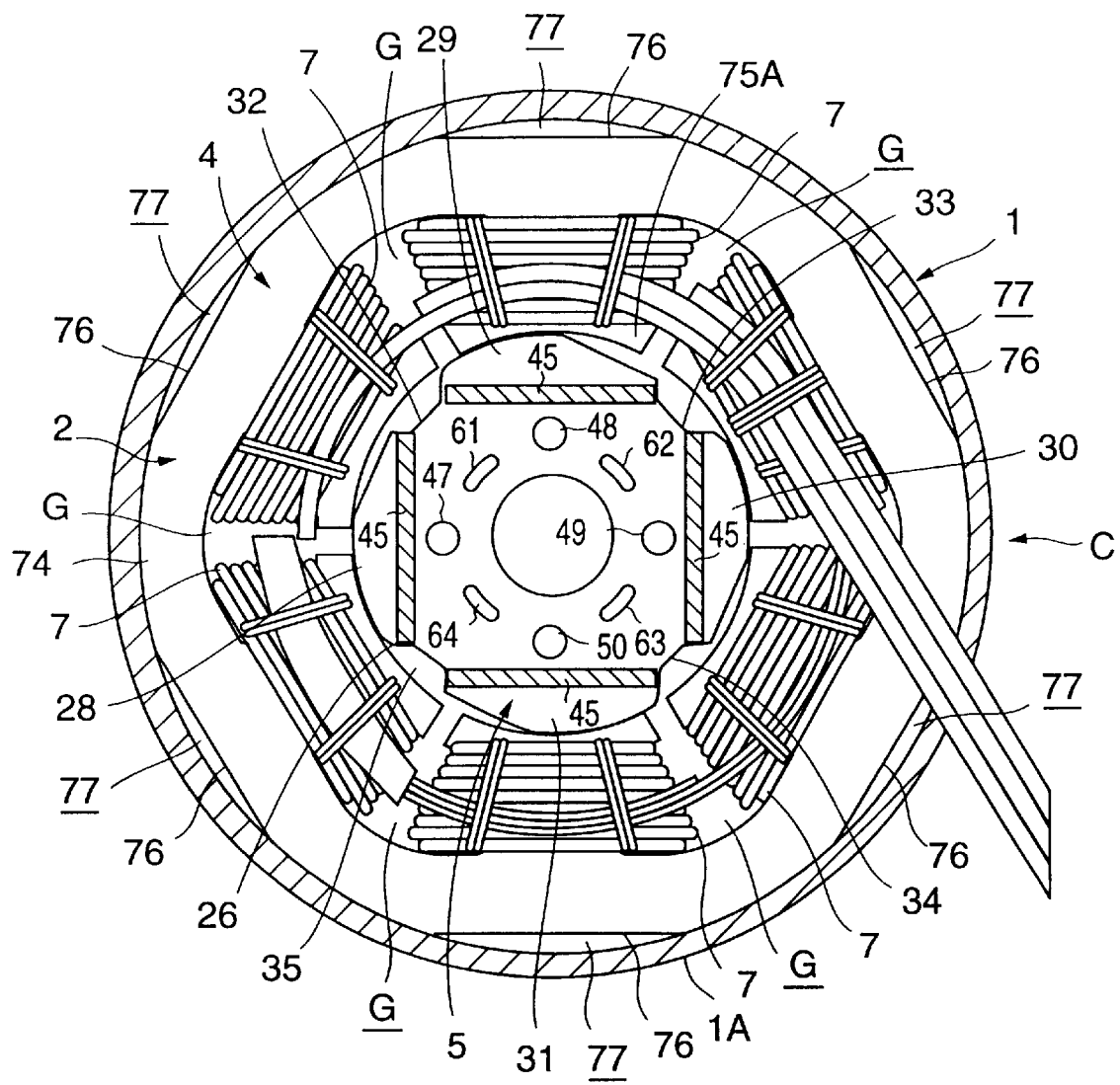
FIG. 2 is a plan cross sectional view of the closed rotary compressor illustrated in FIG. 1.
Figure 3:
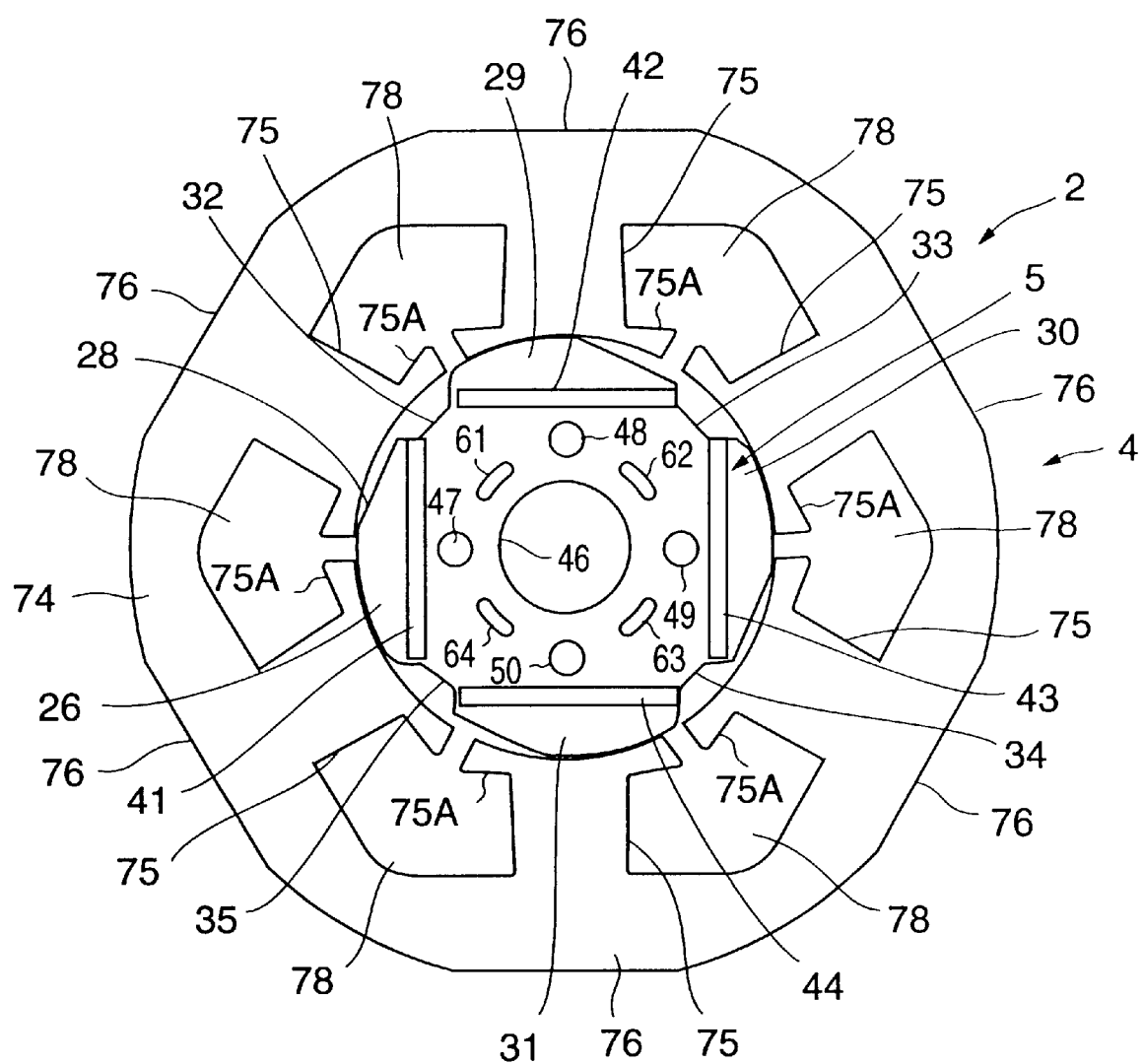
FIG. 3 is a plan view showing a stator core and a rotator core of the closed rotary compressor illustrated in FIG. 1.
Figure 14:
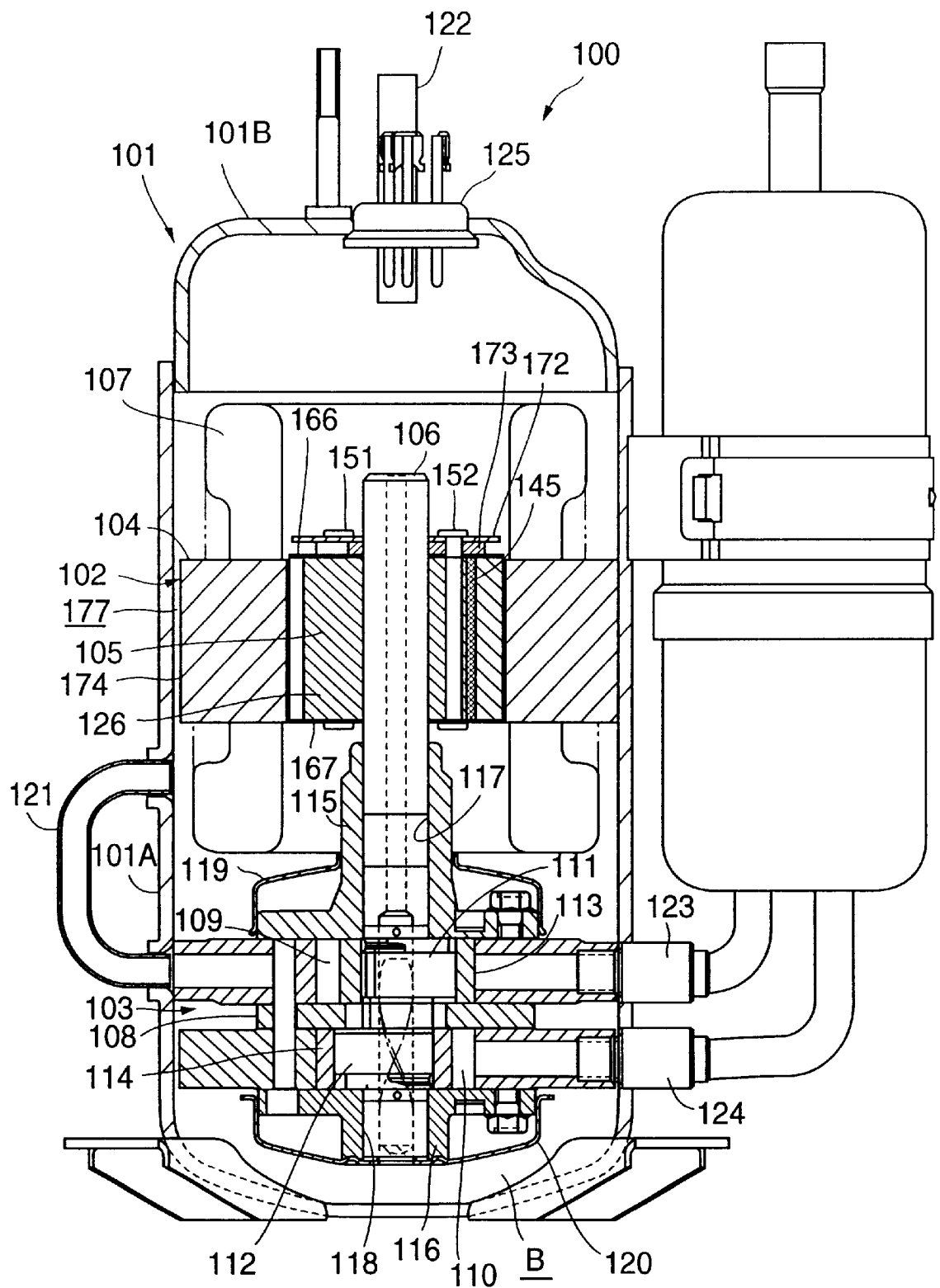
FIG. 14 is a longitudinal side sectional view showing a conventional closed rotary compressor.
Figure 15:
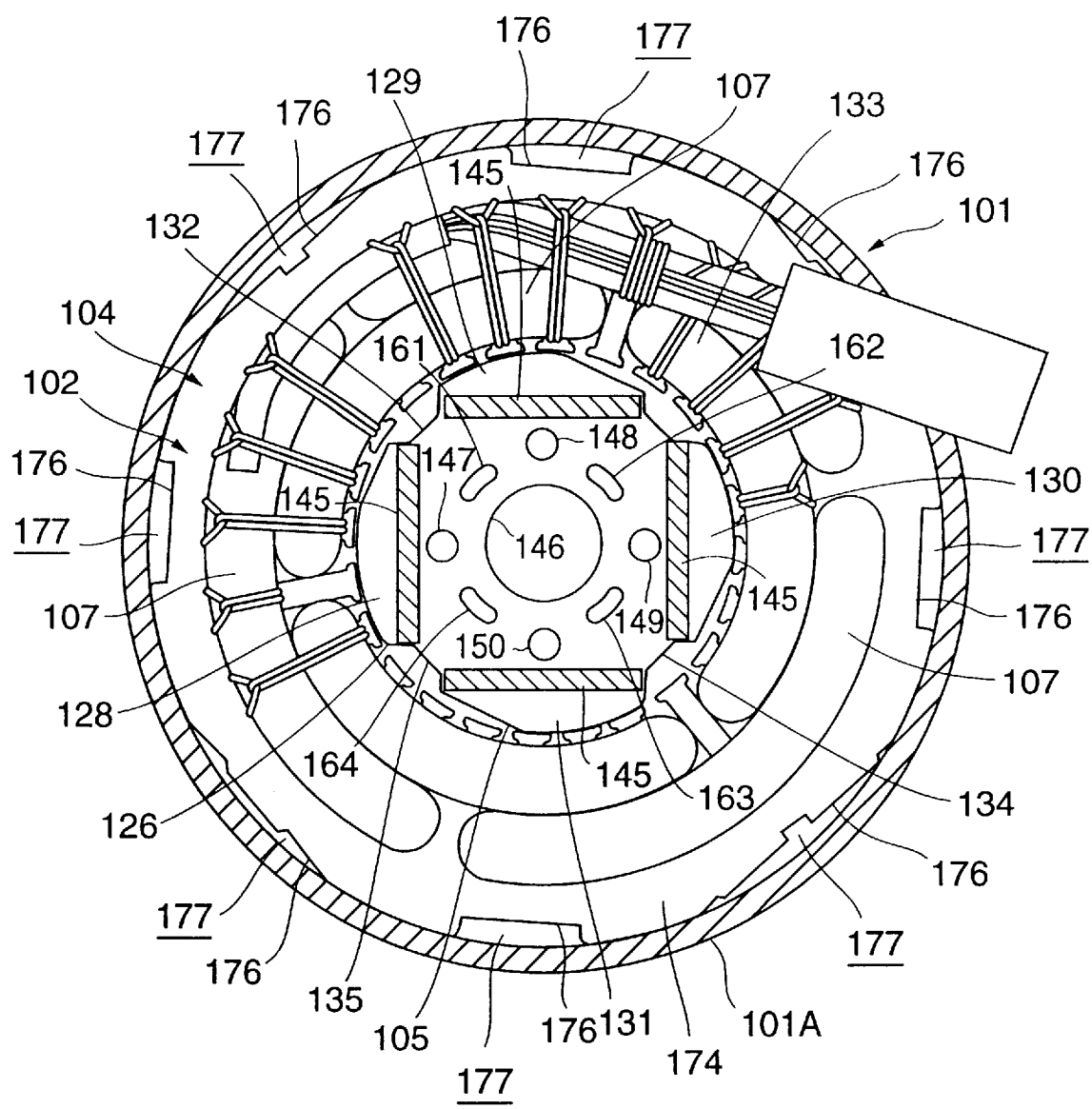
FIG. 15 is a plane cross section of the closed rotary compressor illustrated in FIG. 14.
Figure 16:
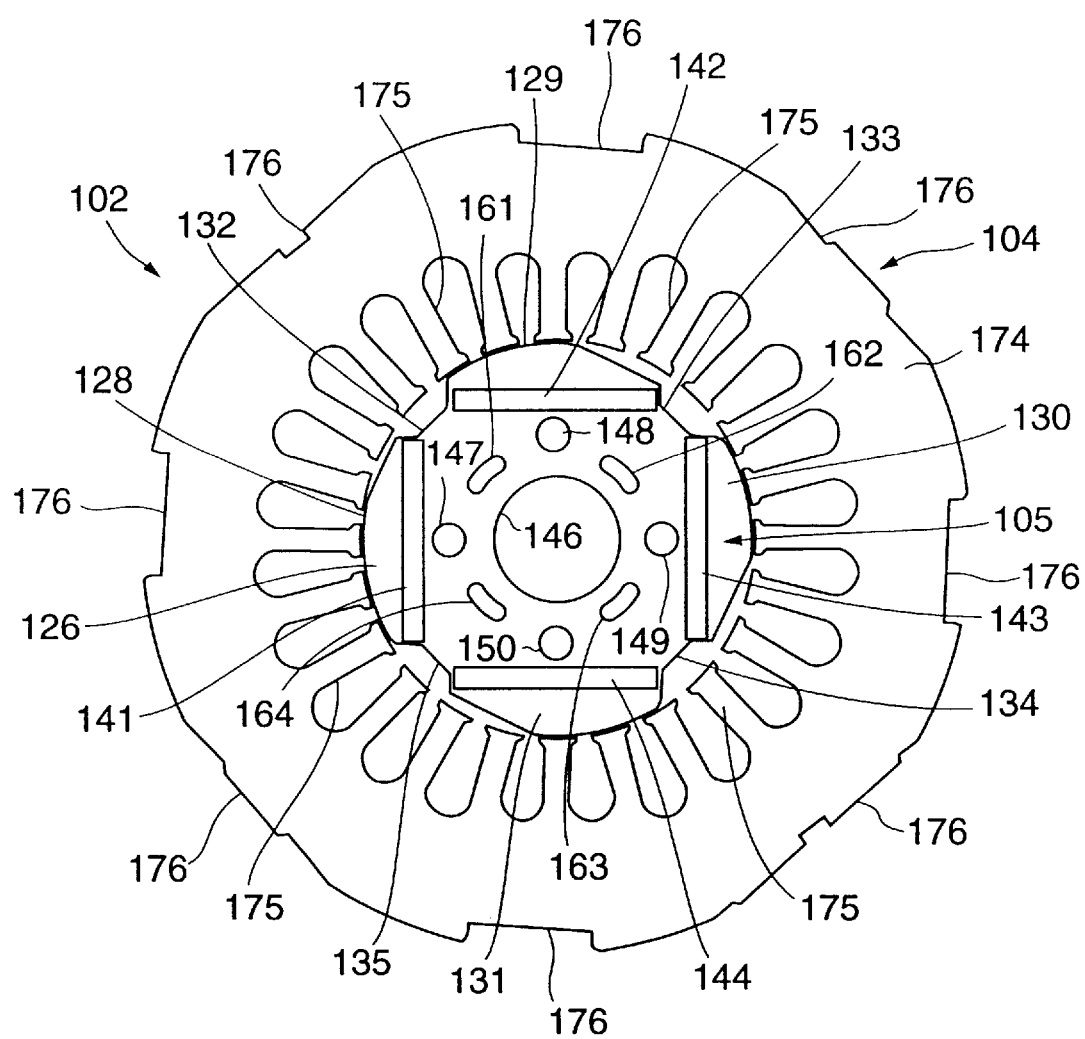
FIG. 16 is a plan view showing a stator core and a rotary core of the closed rotary compressor depicted in FIG. 14.

By adopting such a DC brushless motor of the magnetic pole concentrated winding type as the electric motor 2, the dimension of the projecting part of the stator winding 7 from the stator core 74 in the vertical direction can be greatly reduced as compared with the prior art (FIG. 14). Further, since the cross sectional area of the slot portion 78 of the stator core 74 also becomes large as shown in FIG. 3, the gap G which is formed inside the stator 4 and pierces in the vertical direction as shown in FIG. 2 is prominently increased as compared with the prior art (FIG. 15).

It is to be noted that the dimensional relationship between the stator 4 and the closed container 1 will be described later.

The outer peripheral surface of the stator core 74 comes into contact with and fixed to the inner wall of the shell portion 1A of the closed container 1. In such a case, a plurality of notches 76 (six in this embodiment) obtained by carving the circumference in the chord-like form are formed on the outer peripheral surface of the stator core 74, and the notches 76 are estranged from the inner wall of the shell portion 1A so that the oil return passage 77 is constituted as will be described later.

On the other hand, the rotary compression element 3 is provided with a first rotary cylinder 9 and a second rotary cylinder 10 separated by an intermediate partition plate 8. Eccentric portions 11 and 12 driven to rotate by the rotating shaft 6 are attached to the respective cylinders 9 and 10, and the eccentric positions of these eccentric portions 11 and 12 are shifted from each other 180 degrees.

Reference numerals 13 and 14 denote first roller and second roller which rotate in the respective cylinders 9 and 10 and turn in the cylinders 9 and 10 by rotation of the eccentric portions 11 and 12. Reference numerals 15 and 16 designate first and second frame bodies, and the first frame body 15 forms a closed compression space of the cylinder 9 between itself and the partition plate 8 while the second frame body 16 similarly forms a closed compression space of the cylinder 9 between itself and the partition plate 8. Furthermore, the first frame body 15 and the second frame body 16 respectively include bearing portions 17 and 18 which rotatably pivot the lower portion of the rotating shaft 6.

Reference numerals 19 and 20 represent cup mufflers which are attached so as to cover the first frame body 15 and the second frame body 16, respectively. It is to be noted that the cylinder 9 communicate with the cup muffler 19 through a non-illustrated communication hole provided to the first frame body 15, and the cylinder 10 likewise communicates with the cup muffler 20 through a non-illustrated communication hole provided to the second frame body 16. In this embodiment, the inside of the cup muffler 20 on the lower side communicates with the cup muffler 19 on the upper side through a through hole 79 piercing the cylinders 9 and 10 and the partition plate 8.

Reference numeral 22 denotes a discharge pipe provided on the top of the closed container 1, 23 and 24, suction pipes respectively connected to the cylinders 9 and 10. Further, reference numeral 25 designates a closed terminal which supplies power from the outside of the closed container 1 to the stator winding 7 of the stator 4 (a lead wire connecting the closed terminal 25 to the stator winding 7 is not shown).

Reference numeral 26 represents a rotator core of the rotator 25 which is obtained by superimposing multiple rotator iron plates punched out from an electromagnetic steel plate having a thickness of 0.3 mm to 0.7 mm in such a shape as shown in FIGS. 2 and 3 and caulking them to be integrally layered.

In such a case, the rotator iron plate of the rotator core 26 is punched out from the electromagnetic steel plate in such a manner that salient pole portions 28 to 31 constituting four magnetic poles are formed, and reference numeral 32 to 35 denote concave portions provided such that salient pole portions are formed between the respective salient pole portions 28 to 31.

Reference numerals 41 to 44 designate slots into which a magnetic body 45 (a permanent magnet) is inserted. These slots correspond to the respective salient pole portions 28 to 31 and are formed on a concentric circle along the axial direction of the rotating shaft 6 on the outer peripheral side of the rotator core 26.

In addition, reference numeral 46 denotes a hole which is formed in the center of the rotator core 26 and into which the rotating shaft 6 is shrinkage-fitted. Reference numerals 47 to 50 represent through holes having a size allowing insertion of later-described caulking rivets 51 therethrough. These holes are formed in accordance with the inner side of the respective slots 41 to 44. Moreover, reference numerals 61 to 64 denote air holes for forming oil passages between the respective through holes 47 to 50. After superimposing the respective rotator iron plates, they are caulked each other to be integrated, thereby forming the rotator core 26.

On the other hand, the magnetic body 45 is made up of a rare earth magnet material such as a praseodymium based magnet or a neodymium based magnet whose surface is nickel-plated, and the outward form thereof has a rectangular shape as a whole with a rectangular cross section. The respective slots 41 to 44 has a size allowing insertion of the magnetic material 45 therethrough.

Figure 5:
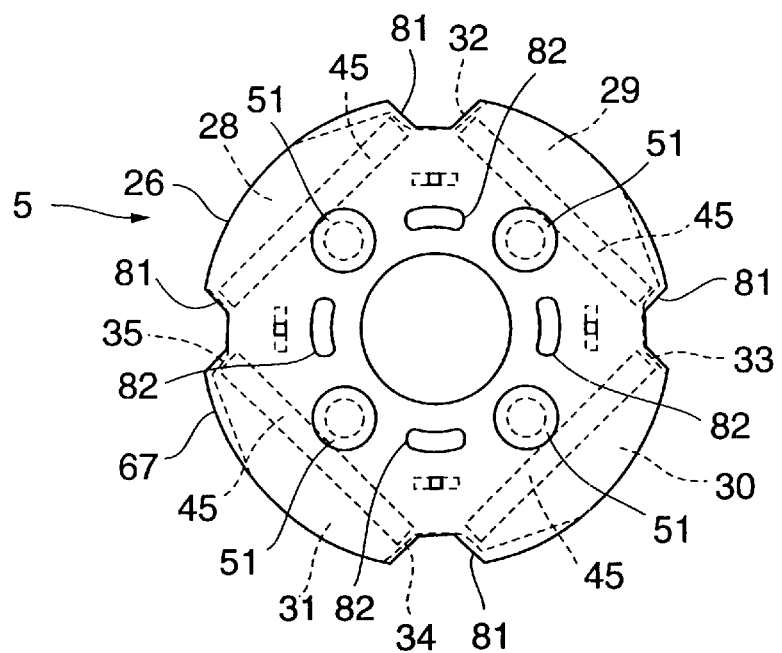
FIG. 5 is a bottom view showing the rotator of the closed rotary compressor illustrated in FIG. 1.

Reference numerals 66 and 67 designate tabular edge members attached to the upper and lower ends of the rotator core 26. These members are constituted by a non-magnetic material such as stainless or brass. In these members, notch portions 81 are formed at positions corresponding to the concave portions 32 to 35 in such a manner that they have substantially the same shape as the stator core 26, and similar air holes 82 are formed at positions corresponding to the air holes 61 to 64 (FIG. 5).

Also, through holes are formed to the edge members 66 and 67 at positions corresponding to the through holes 47 to 50.

Figure 4:
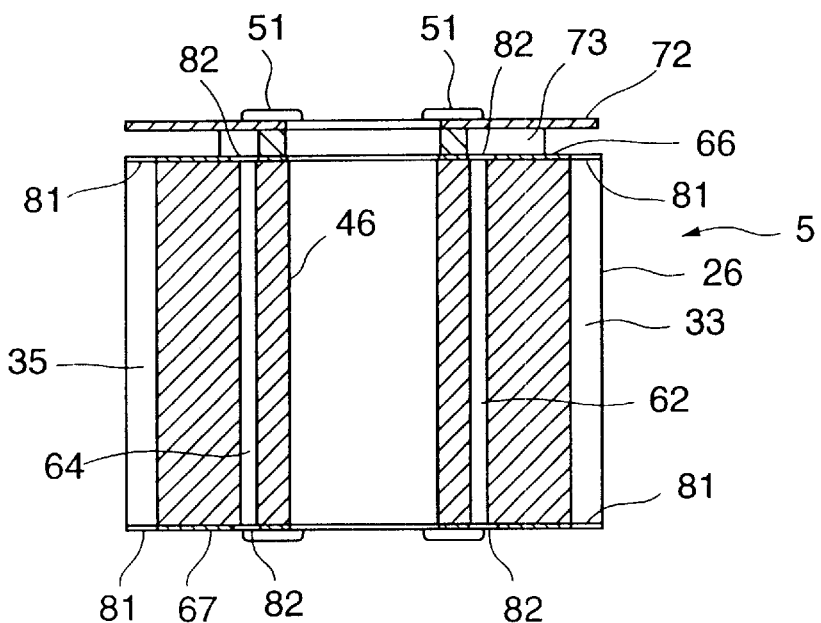
FIG. 4 is a longitudinal side sectional view showing a rotator of the closed rotary compressor illustrated in FIG. 1.
Figure 6:
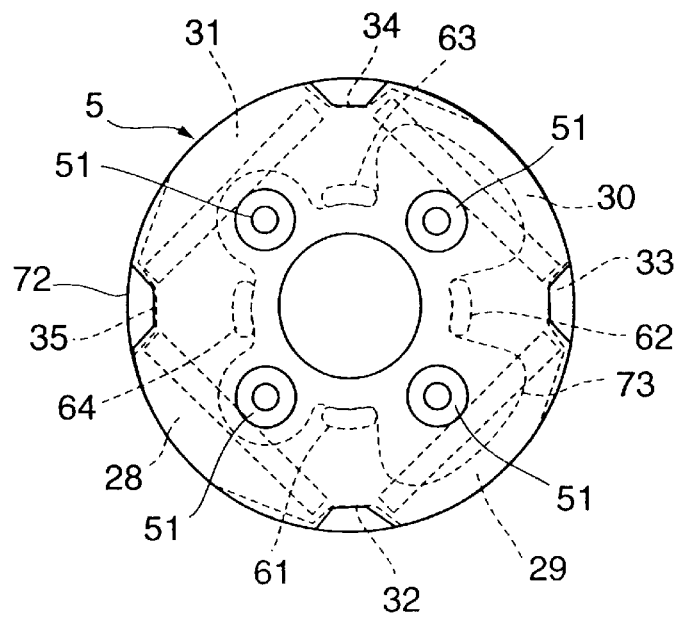
FIG. 6 is a top view showing the rotator of the closed rotary compressor illustrated in FIG. 1.

It is to be noted that reference numeral 72 designates a discoid oil separation plate attached to the rotator 5 at a position above the edge member 66, and 73, a balance weight attached between the plate 72 and the edge member 66 (see FIGS. 4 and 6).

With such a structure, when the stator winding 7 of the stator 4 of the electric motor 2 is energized, the rotating magnetic field is formed to rotate the rotator 5. Rotation of the rotator 5 causes eccentric rotation of the rollers 13 and 14 in the cylinders 9 and 10 through the rotating shaft 6, and the intake gas absorbed from the suction pipes 23 and 24 is compressed.

The compressed high pressure gas is emitted from the cylinder 9 into the cup muffler 19 through the communication hole and further discharged from the discharge holes 83 (FIG. 7) formed to the cup muffler 19 into the upper closed container 101. On the other hand, the gas is emitted from the cylinder 10 into the cup muffler 20 through the communication hole to enter the cup muffler 19 via the through hole 79 and further discharged from the discharge holes 83 into the upper closed container 1.

Figure 7:
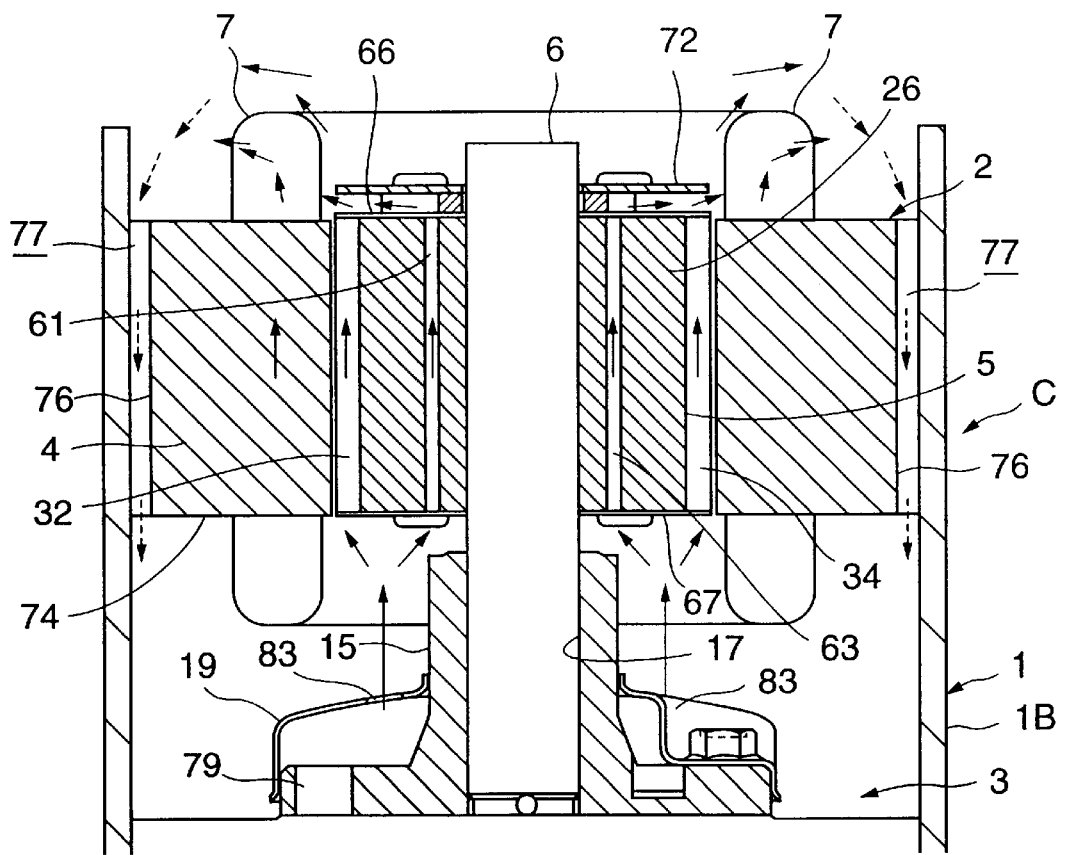
FIG. 7 is an enlarged longitudinal side sectional view showing an electric motor part of the closed rotary compressor illustrated in FIG. 1.

As indicated by arrows in FIG. 7, the discharged high pressure gas passes the gap G in the stator 4 of the electric motor 2 or the gap between the stator core 74 and the rotator 5, the concave portions 32 to 35 of the rotator core 26, the air holes 61 to 62 and the notches 81 of the edge members 66 and 67, and the air holes 82 to move up. The gas abuts on the plate 72 to be directed outwards by the centrifugal force. The gas is discharged from the discharge pipe 22, and the oil flows down through the passage 77 to be fed back to the oil bank B on the bottom portion in the closed container 1.

In such a manner, since the relatively large gap G in the stator 2 or the concave portions 32 to 35 of the rotator core 26, the air holes 61 to 62 and the notch portions 81 of the edge members 66 and 67, and the air holes 82 are formed in the electric motor 2, the flow velocity of the gas moving up becomes relatively low. Therefore, the gas and the oil can be easily separated from each other.

Moreover, since the motor is of the magnetic pole concentrated winding type, the dimension of the part of the stator winding 7 projecting upwards from the stator core 74 becomes smaller as compared with the prior art. Thus, the oil directed outwards from the plate 72 easily moves beyond the stator winding 7 and collides with the inner wall of the closed container 1 to flow toward the passage 77.

Consequently, the large space for the oil separation does not have to be assured within the closed container 1, and the downsizing of the electric motor 2 itself and reduction in the overall dimension of the closed rotary compressor C can be both achieved.

Here, assuming that a distance from the upper end of the stator winding 7 of the electric motor 2 to the lower surface of the upper wall of the end cap portion 1B of the closed container 1 is L1 and the vertical dimension of the stator winding 7 of the stator 4 of the electric motor 2 is L2, when L1/(L1+L2) are changed in various ways, FIG. 8 shows an overall height L of the closed rotary compressor 1 and an oil discharge quantity from the discharge pipe 22. It is to be noted that each value is represented in the form of a ratio when the overall height L of the conventional closed motor compressor using an AC motor as the electric motor is determined as 100 and the oil discharge quantity as 100.

Further, as to the DC brushless motor, each value is shown in the case of the conventional rotary compressor 100 depicted in FIG. 14.

As apparent from the drawing, when the space in the closed container 1 above the stator 4 is compressed and L1/(L1+L2) becomes 0.3, the overall height L is reduced to 77% of that of the AC motor closed rotary compressor but the oil discharge quantity is increased to 90% (the conventional DC motor closed rotary compressor 100 also has 90% oil discharge quantity).

When the space in the closed container above the stator 4 is enlarged and L1/(L1+L2) becomes 0.6, the overall height L becomes equal to that of the AC motor closed rotary compressor (100%) but the oil discharge quantity is decreased to 8%.

Therefore, each dimension is set so that $0.3 \leq L1/(L1+L2) \leq 0.6$ is obtained in this embodiment. As a result, the height of the closed rotary compressor C can be greatly reduced while maintaining the oil discharge quantity from the closed container 1 to be equal to that in the prior art, or the oil discharge quantity can be prominently reduced while maintaining the height of the closed rotary compressor to be equal to that of the prior art.

The lowermost column in FIG. 8 shows a ratio of an all-passage area (the passage area communicating in the vertical direction) X of the part of the stator 4 to which the area of the passage 77 and the gap G is added with respect to an inner peripheral cross sectional area Y of the closed container 1.

That is, X=the area of the passage 77+the area of the gap G.

Y=the inside cross sectional area of the closed container 1

The ratio of the lowermost column in FIG. 8=X/Y×100 (%)

When the space in the closed container 1 above the stator 4 is decreased to reduce the ratio of the overall height L to 77%, the oil discharge quantity becomes equal to or smaller than (smaller than that of the AC motor) that in the prior art if the above-described ratio is not less than 3.8%. Therefore, the above-mentioned ratio is set to not less than 3.8% in the present embodiment.

In particular, the passage area of the gap G is set larger than that of the passage 77, and the area of the gap G is 266.4 square millimeter while the area of the passage 77 is 246.0 square millimeter in the example in FIG. 2.

Figure 9:
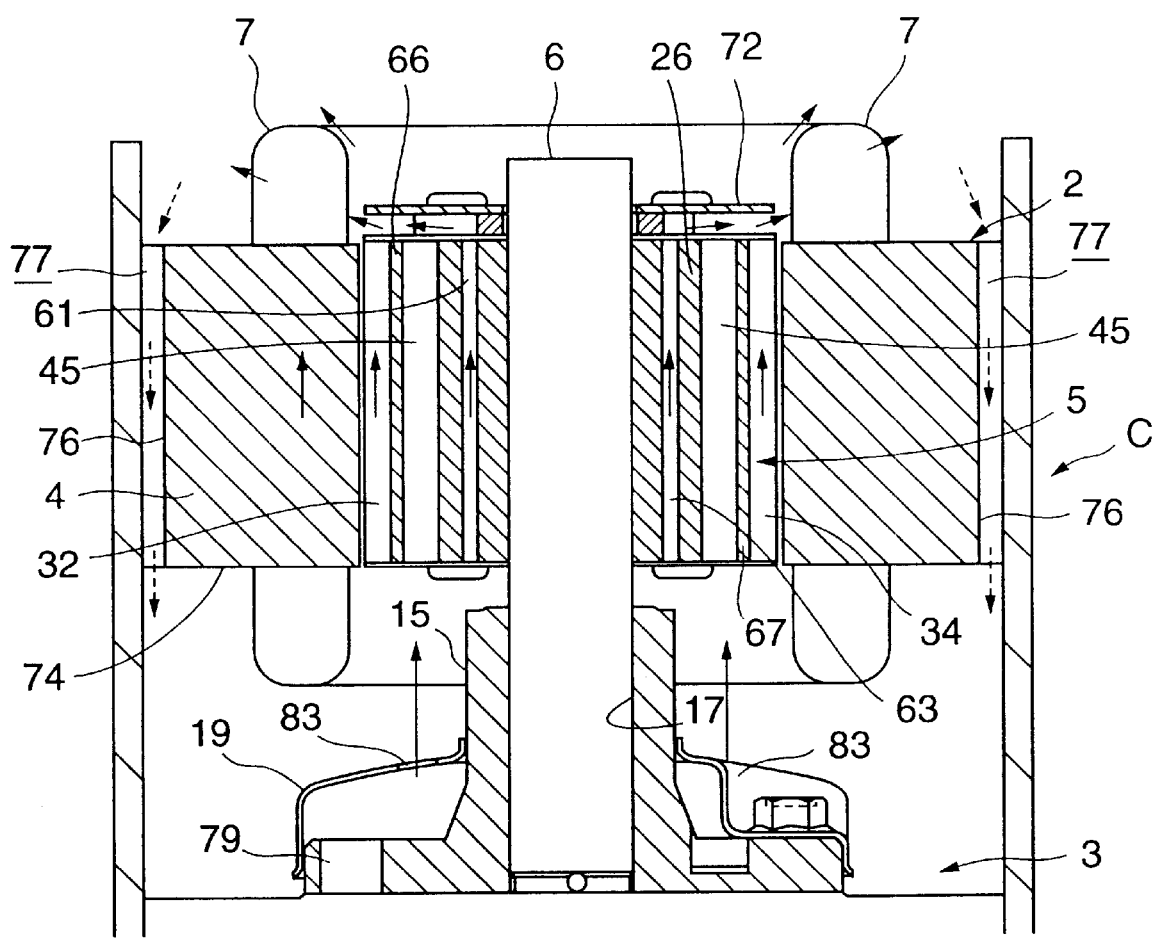
FIG. 9 is an enlarged cross sectional view showing an electric motor part of a closed rotary compressor according to another embodiment of the present invention.

Here, FIG. 9 shows another embodiment of the rotator 5. In this case, through holes 84 piercing the rotator core 26 and the edge members 66 and 67 in the vertical direction are formed to the rotator core 26 at positions corresponding to the upper parts of the discharge holes 83 of the cup muffler 19. Consequently, since the gas discharged from the discharge holes 83 smoothly flows in the through holes 61 to 64 as indicated by arrows in FIG. 9 and moves up, the gas flow velocity can be further reduced, thereby improving the oil isolation.

Figure 10:
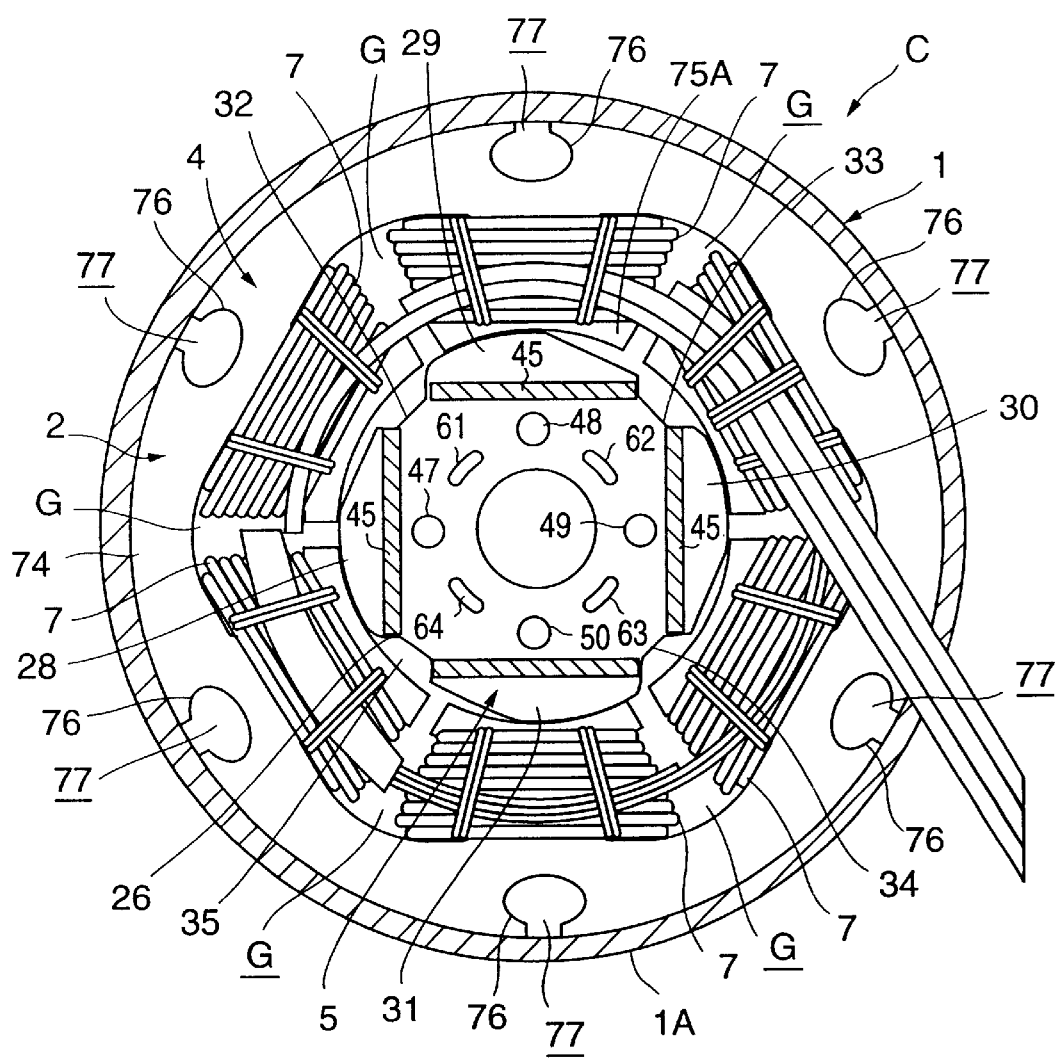
FIG. 10 is a plane cross section of a closed rotary compressor according to still another embodiment of the present invention.
Figure 11:
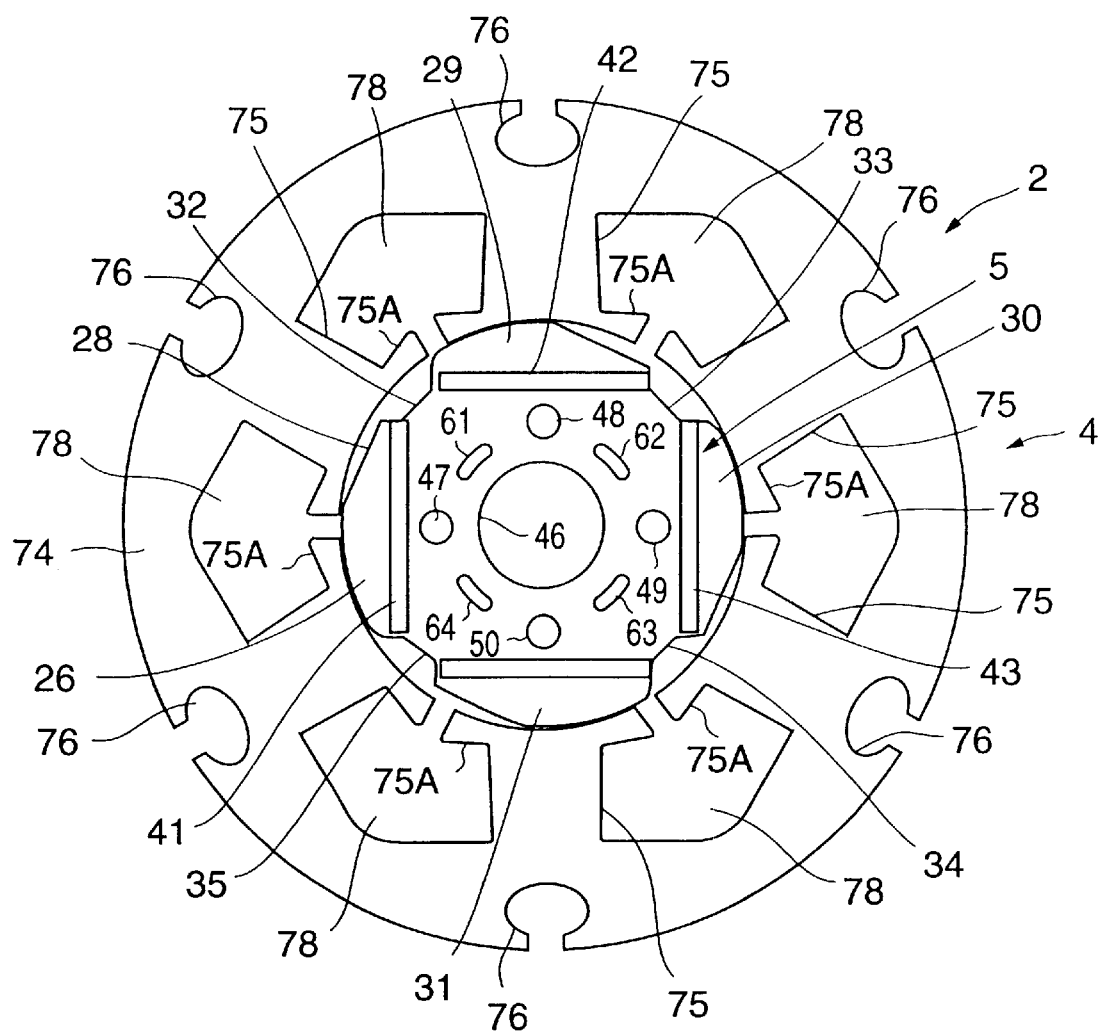
FIG. 11 is a plan view showing a stator core and a rotator core of the closed rotary compressor illustrated in FIG. 10.

Additionally, FIGS. 10 and 11 shows another embodiment of the stator 4. In this case, the notches 76 formed at six positions on the outer peripheral surface of the stator core 74 have a sectional shape narrowly bent on the outer peripheral side of the stator 4 and have a concave shape that the inner side is widened elliptically. The outer peripheral surface of the stator core 74 other than the bent part is configured to come into contact with the inner wall of the shell portion 1B of the closed container 1.

Therefore, since the passage 77 having the sectional shape which is narrow on the outer peripheral side of the stator 4 and wide on the inner side is formed in the notch 76, the contact area of the stator 4 and the closed container 1 can be enlarged while assuring the large area of the oil return passage 77. In particular, since the area of the non-contact portion at one position can be also reduced, such an inconvenience as that the closed container 1 is bent inwardly can be avoided.

It is to be noted that the oil can smoothly flows down on the inner wall because the passage 77 communicates with the inner wall of the shell portion 1B.

Figure 12:
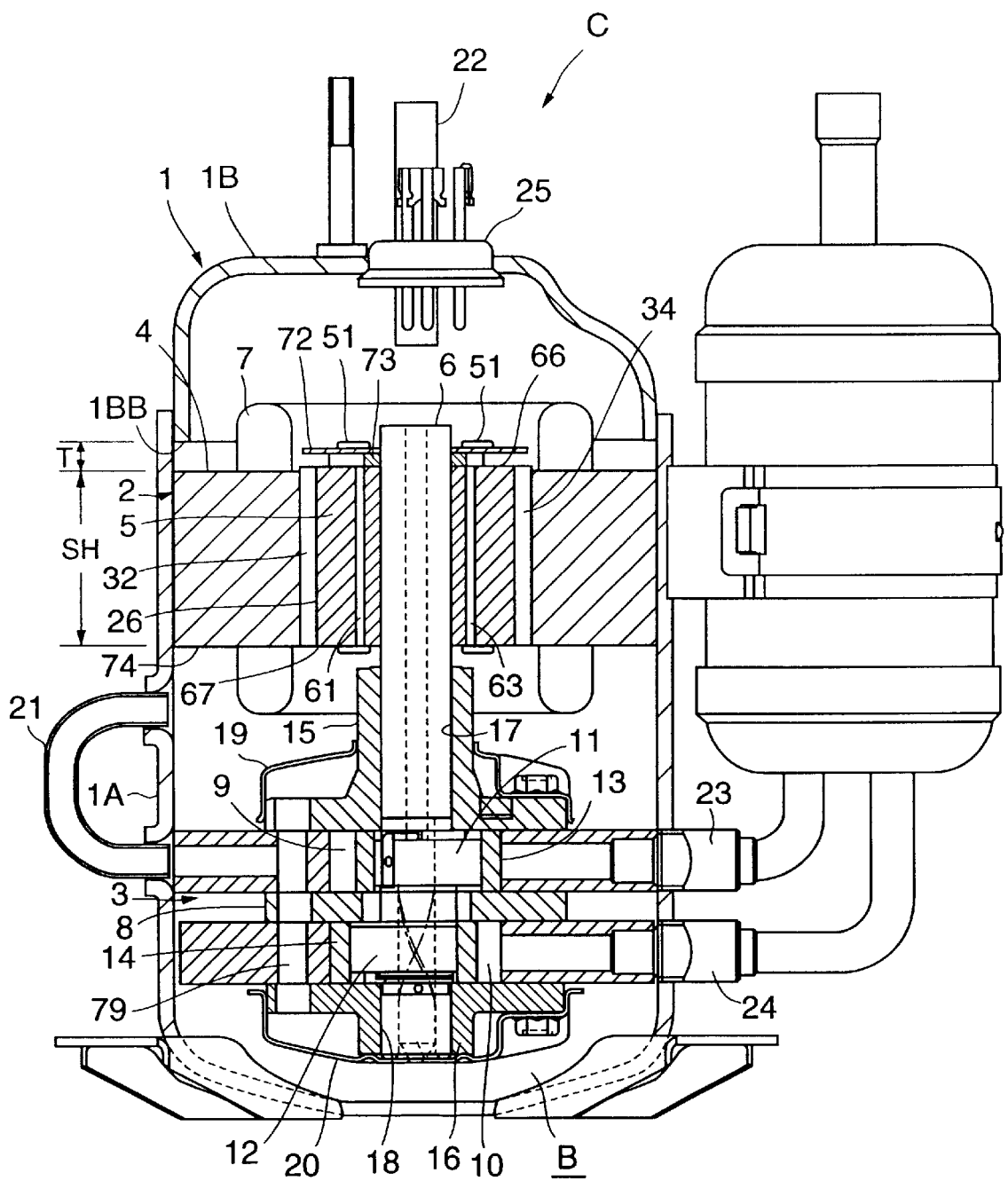
FIG. 12 is a longitudinal side sectional view of a closed rotary compressor according to yet another embodiment of the present invention.

FIG. 12 shows another embodiment of the closed rotary compressor C according to the present invention. In this case, a bypass pipe 21 is disposed to the outside of the closed container 1, and this bypass pipe 21 connects the through hole 79 with the space in the closed container 1 below the electric motor 2. Consequently, the gas discharged to the cup muffler 20 also flows in the bypass tube 21 and is exhausted from the upper end outlet to the lower side of the electric motor 2 in the horizontal direction. It is to be noted that, in the drawing, like reference numerals denote parts similar to those in FIG. 1 and the dimensional relationship between L1 and L2 is set as similar to FIG. 1.

However, in addition to FIG. 1, assuming that the volume height of the stator core 74 of the stator 4 is SH and the distance from the stator core 74 to the lower edge (indicated by 1BB) of the end cap portion 1B is T in this case, each dimension is set so as to achieve the following expression.

$$0.15 < T/SH < 0.5$$

Here, since a number of slot portions of the magnetic pole concentrated winding type motor is small, the cogging torque is high and the motor vibration is also large. The motor vibration is transmitted to the closed container 1 and propagated to the outside as the noise, and the vibration of the closed container 1 becomes large as the distance T from the stator core 74 to the lower edge 1BB of the end cap portion 1BB becomes larger.

Figure 13:
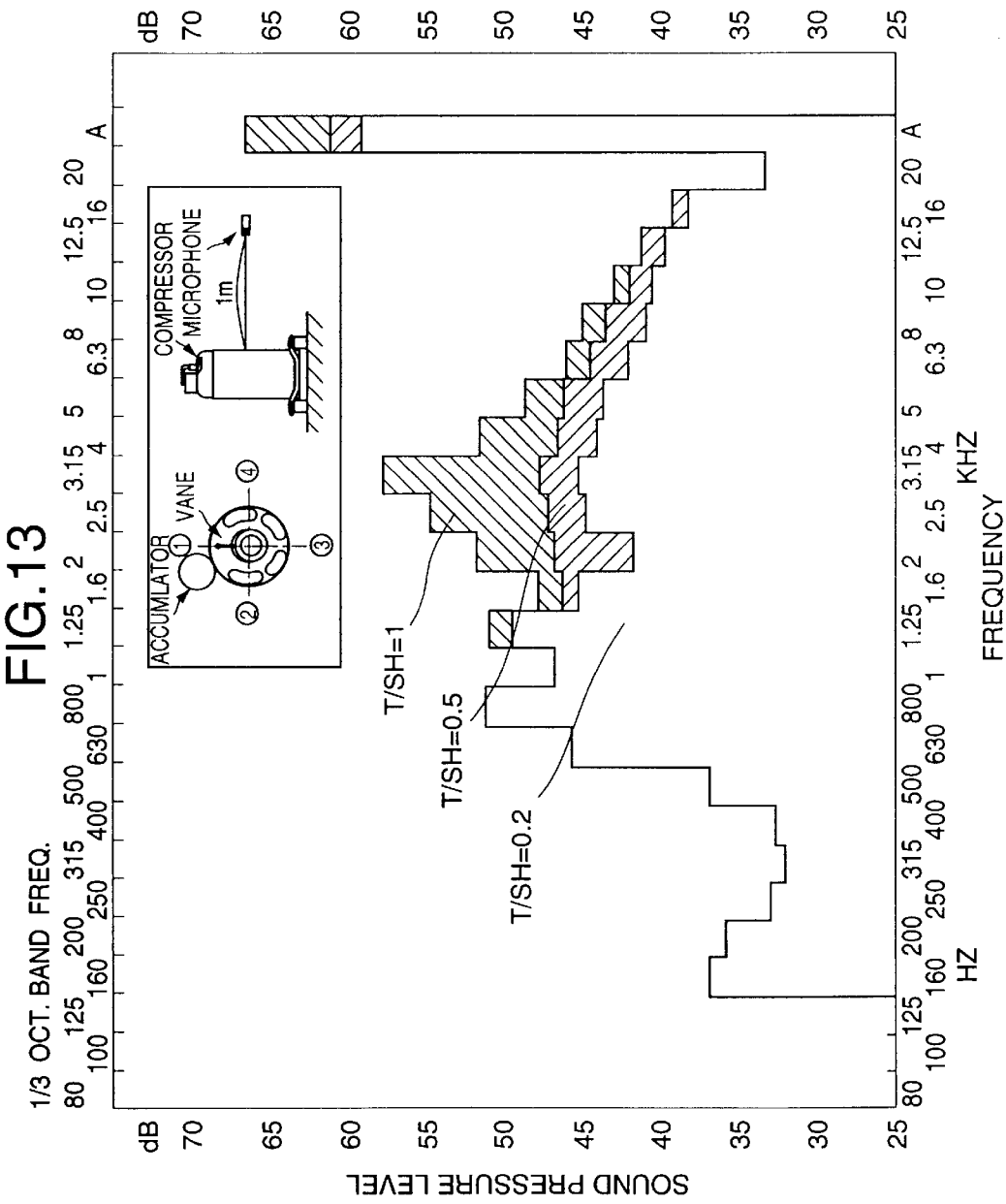
FIG. 13 is a view showing a noise value when SH and T in FIG. 12 are changed.

This state is shown in FIG. 13. That is, it is understood that the sound pressure level is increased when the distance T becomes large and T/SH=1 is attained. Therefore, setting the dimension range of this embodiment can suppress the vibration of the closed container 1 and reduce the noise. Although there is a method for increasing the height of the end cap portion 1B in order to reduce the noise, this can not be adopted because the height of the closed rotary compressor C is disadvantageously increased.

The lower limit 0.15 is determined in the structural practical range. Further, this dimensional relationship can be naturally applied to the embodiment shown in FIG. 1.

According to the present invention described above, in the closed rotary compressor for accommodating the electric element and the rotary compression element driven by the rotary shaft connected to the electric element in the closed container, since the electric element is constituted by the motor of the magnetic pole concentrated winding mode comprising: the stator fixed to the inner wall of the closed container; the rotor rotatably supported by the rotating shaft on the inner side of the stator; the stator core constituting the stator; a plurality of the cog portions and slot portions formed to the stator core; and the stator winding directly wound around the respective cog portions by utilizing the slot portions, adopting this motor of the magnetic pole concentrated winding type can reduce the dimension of the protruding part of the stator winding from the stator core, thereby obtaining the excellent oil separation effect.

Consequently, the large space for the oil separation does not have to be assured in the closed container, and the downsizing of the electric element itself and the reduction in overall size of the closed rotary compressor can be both attained.

In particular, in the cases where the rotary compression element is accommodated on the bottom portion in the closed container; the electric element is arranged above the former element; the discharge pipe is attached on the upper wall of the closed container; the distance from the upper end of the stator winding of the electric element to the lower surface of the upper wall is L1 and the vertical dimension of the stator of the electric element is L2, the following can be achieved when each dimension is set so as to satisfy the expression shown below.

$$0.3 \leq L1/(L1+L2) \leq 0.6$$

The height of the closed rotary compressor can be greatly reduced while maintaining the oil discharge quantity from the closed container to be equal to that in the prior art, or the oil discharge quantity can be largely reduced while maintaining the height of the closed rotary compressor to be equal to that of the prior art.

In addition, the rotator comprises the rotary core, the concave portions formed across the outer peripheral surface of the rotary core in the vertical direction, and the edge members attached to the both upper and lower edges of the rotary core, and the notch portions are formed to the edge members at positions corresponding to the concave portions of the rotary core. The edge members hence do not interfere with the gas moving up in the concave portions of the rotary core, and the gas flow velocity can be lowered to improve the oil isolation.

Moreover, since the discharge holes formed to the cup mufflers of the rotary compression element are provided and the through holes extending to the both upper and lower edges of the rotator are formed at positions corresponding to the upper parts of the discharge holes, the gas discharged from the discharge holes can smoothly flow in the through holes of the rotator to move up. This can further decrease the gas flow velocity to improve the oil isolation.

Further, a plurality of concave passages extending to the both upper and lower ends are formed on the outer peripheral surface of the stator at predetermined intervals, each passage has a cross sectional shape such as that it is narrow on the outer peripheral side of the stator and wide on the inner side, and the outer peripheral surface of parts other than each passage is in contact with the inner wall of the closed container. Thus, the contact area of the stator and the closed container can be enlarged while assuring the wide oil return passage, and the area of the non-contact portion at one position is reduced to avoid an inconvenience such as deformation of the closed container.

Additionally, in the cases where the closed container is composed of the shell portion whose one end accommodating the electric element and the rotary compression element is opened and the end cap portion for closing the opening of the shell portion; the volume height of the stator core of the stator for the electric element is determined as SH; and the distance from the stator core to the edge of the end cap portion is determined as T, the following can be achieved when each dimension is set so as to satisfy the following expression.

$$0.15 < T/SH < 0.5$$

Even if the cogging torque is large and the magnetic pole concentrated winding type motor having a tendency that the vibration becomes large is adopted, the vibration of the closed container itself can be suppressed and the noise is reduced.

Further, since the passage area in the stator is set not less than 3.8% of the inside cross sectional area of the closed container, the oil discharge quantity is further decreased.

Description will now be given as to the closed rotary compressor as still another embodiment according to the present invention.

Figure 25:
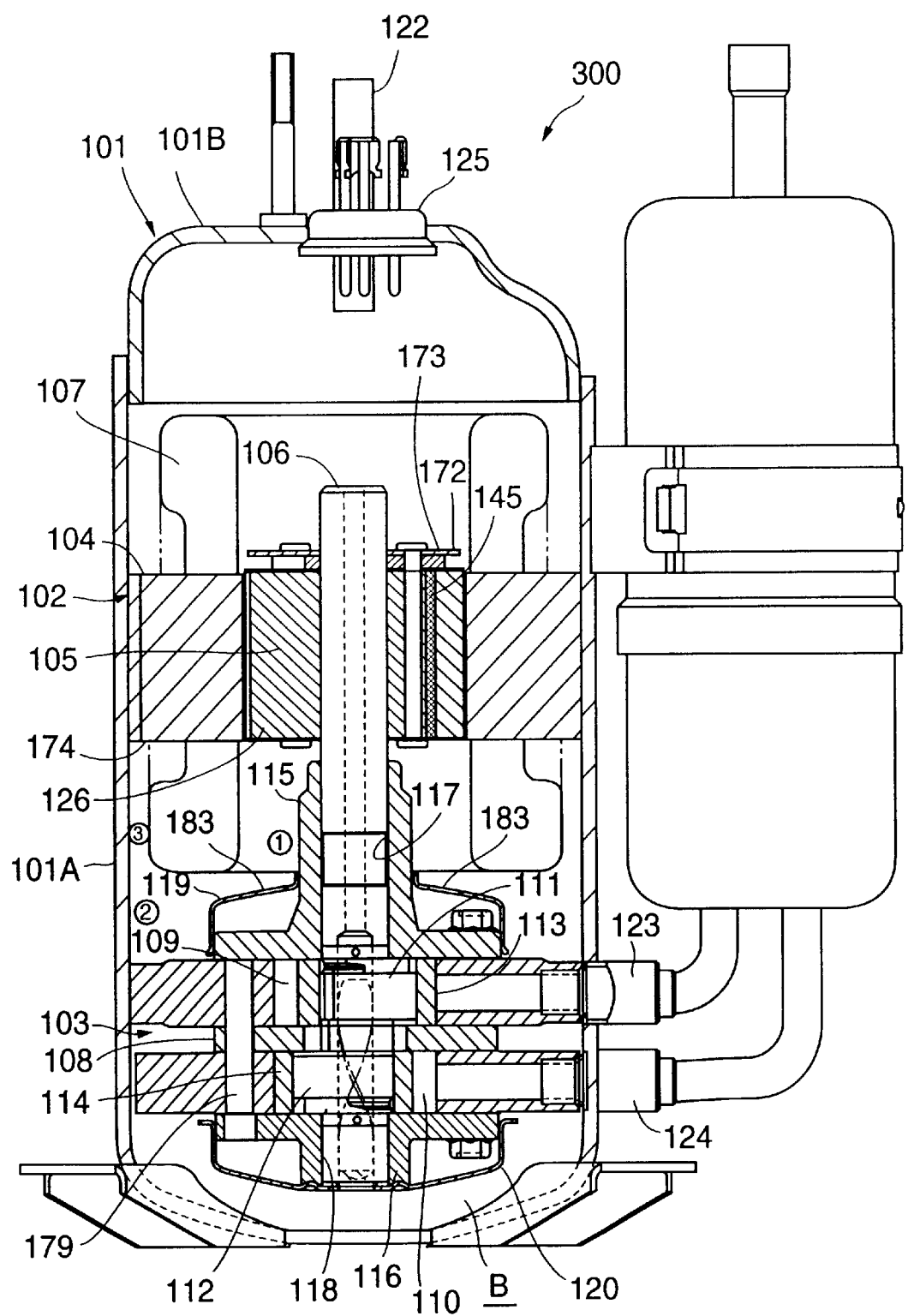
FIG. 25 is a longitudinal side sectional view of the conventional rotary compressor.

Here, this kind of conventional closed rotary compressor 300 will be explained with reference to FIGS. 25 and 26. In these drawings, like reference numerals denote parts equal or similar to those in FIG. 14. In this structure, the compressed high pressure gas is discharged from the cylinder 109 into the cup muffler 119 through the communication hole and further emitted from the discharge hole 183 formed to the cup muffler 119 into the upper (direction of the electric motor 102) closed container 101. On the other hand, the gas is discharged from the cylinder 110 into the cup muffler 120 through the communication hole, emitted into the cup muffler 119 via the through hole 179 and further exhausted from the discharge hole 183 of the cup muffler 119 into the upper closed container 101.

The discharged high pressure gas passes the gap in the electric motor 102 to reach the discharge pipe 122 and exhausted to the outside. On the other hand, although the oil is contained in the gas, the oil is separated by the plate 172 and others before reaching the discharge pipe 122 and directed to the outer side by the centrifugal force. The oil further passes the passage 177 and the like to flow down in to the oil bank B.

In this manner, in this type of closed rotary compressor 300, since the gas discharged from the cylinder 109 positioned on the upper side and the gas emitted from the cylinder 110 on the lower side are exhausted from the cup muffler 119 into the space in the closed container 101 provided on the lower side of the electric motor 102 with their phases being shifted from each other 180 degrees, the columnar resonance is excited, and a standing wave is generated in the circumferential direction of the cylinder of the closed container 101.

Figure 26:
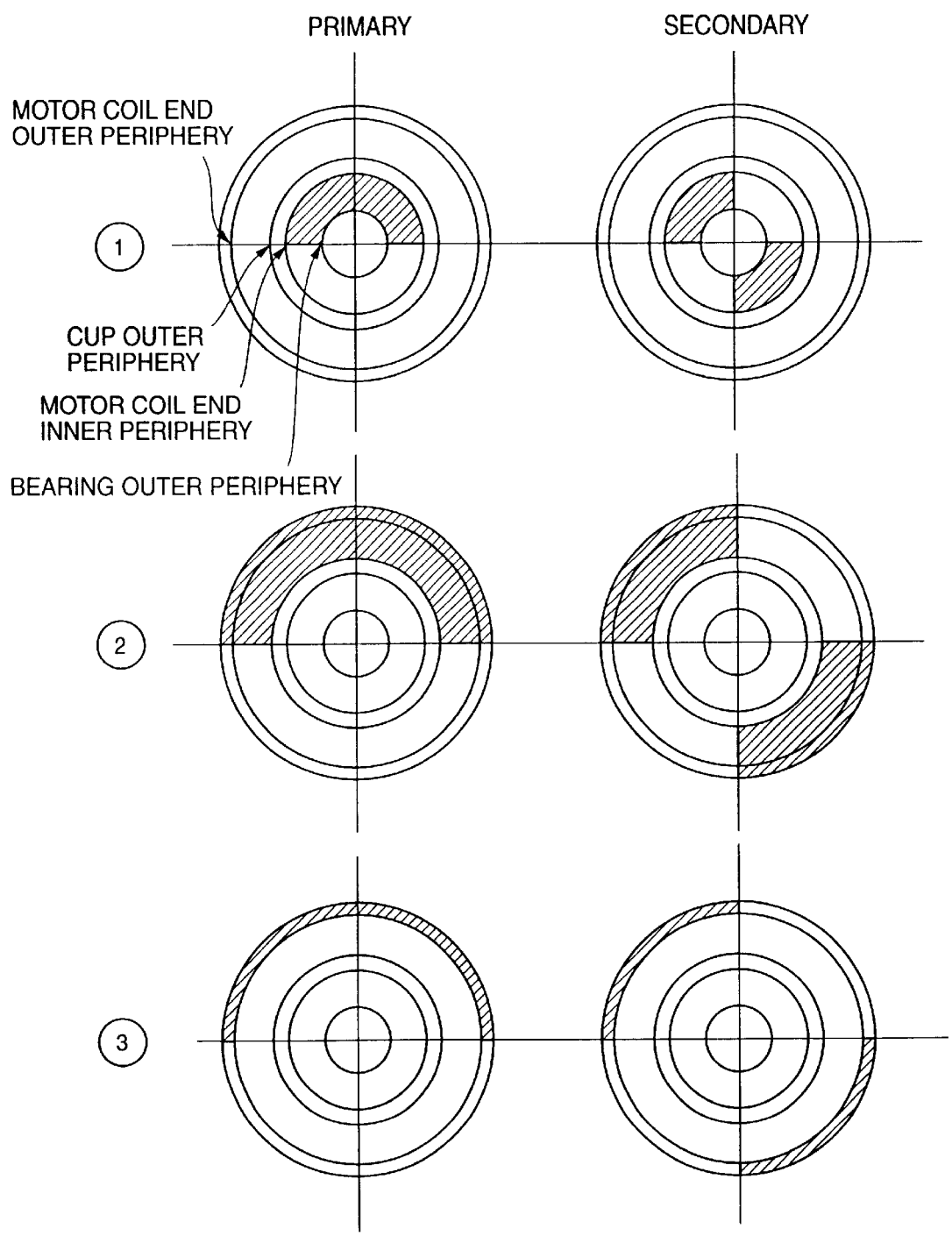
FIG. 26 is a view for explaining a columnar resonance mode of a space on the lower side of the electric motor of the closed rotary compressor.

FIG. 26 shows the columnar resonance mode on the lower side of the electric motor 102. In the drawing, ①, ② and ③ denote standing waves in primary and secondary modes at positions ①, ② and ③ shown in FIG. 9, and the pressure in the part indicated by the hatching in the drawing is higher than those in other parts.

Figure 24:
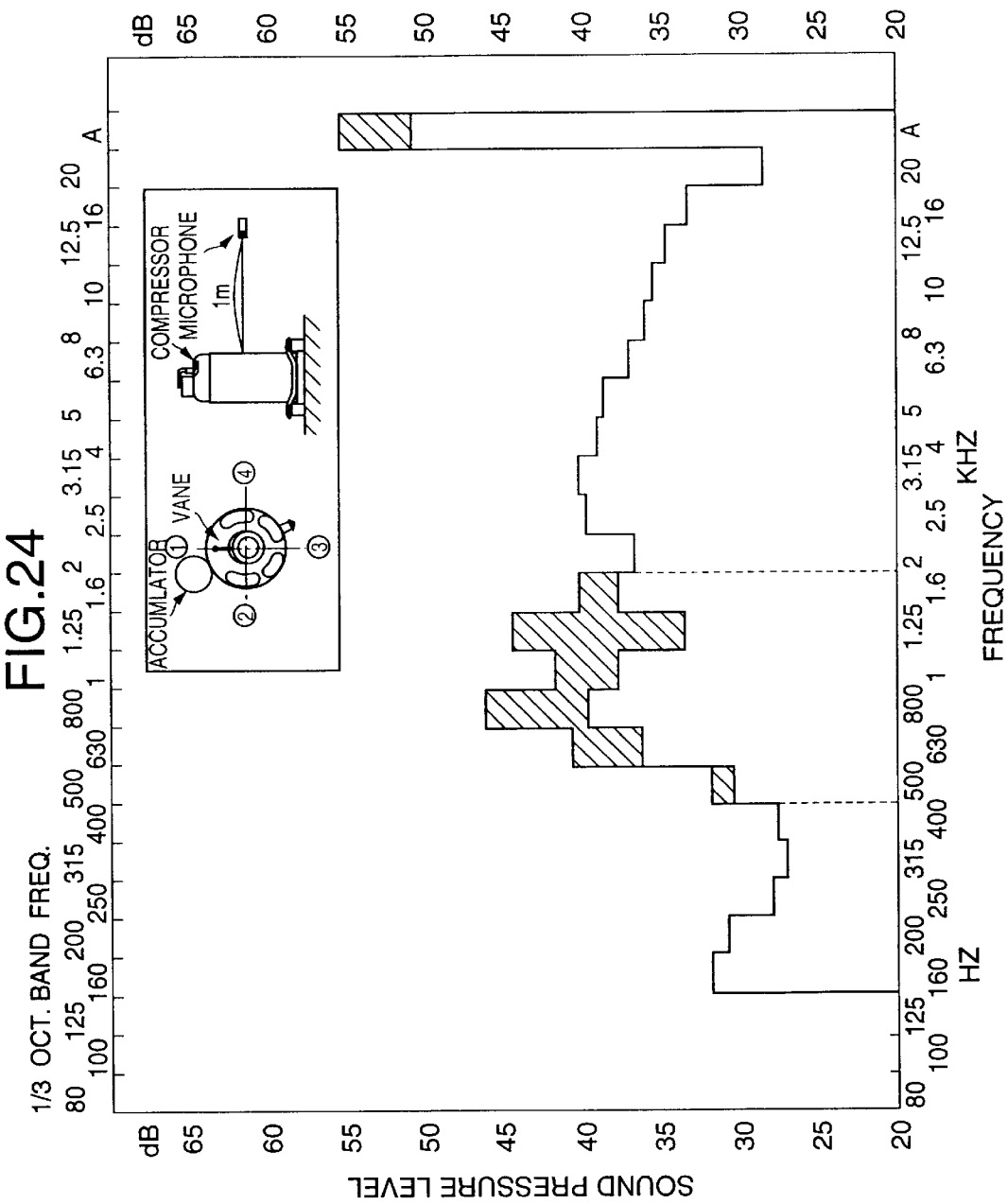
FIG. 24 is a view showing a sound pressure level of a noise generated by the closed rotary compressor.

When such a columnar resonance is excited, the low frequency sound of 600 HZ to 1.6 kHZ is increased as indicated by hatching in FIG. 24. This low frequency sound is apt to be transmitted though the closed container 101 and the nose during the operation becomes hence considerably large.

Therefore, there is adopted such a structure that the bypass pipe 121 is attached to the outside of the closed container 101 as shown in FIG. 14 and the lower end of the bypass pipe 121 is caused to communicate with the lower cup muffler 120 through the through hole 179 while the upper end of the bypass pipe 121 is opened on the inner wall surface of the upper closed container 101 above the rotary compression element 103.

This structure intends to discharge the gas emitted from the lower cylinder 110 into the closed container 101 from the circumferential direction of the cylinder of the closed container 101 by using the bypass pipe 121 and cause the gas to collide with the stationary wave in the circumferential direction on the lower side of the electric motor 102 in order to burst the stationary wave. However, since the stator winding 107 constituting the stator 104 of the conventional electric motor 102 is of the distributed winding type, the stator winding 107 relatively largely protrudes from the stator core 174 in the vertical direction as shown in FIGS. 25 and 26.

Thus, taking the bend radius of the bypass pipe 121 into consideration as shown in FIG. 14, the upper end thereof is opened toward the outer surface of the stator winding 107 which protrudes downwards from the electric motor 102, and the gas is discharged from the circumferential direction toward the stator winding 107, thereby disabling the effective bursting of the circumferential stationary wave. It is to be noted that the hatching in FIG. 24 shows the FIG. 14 structure and the low frequency sound actually becomes larger in the FIG. 25 structure.

Figure 17:
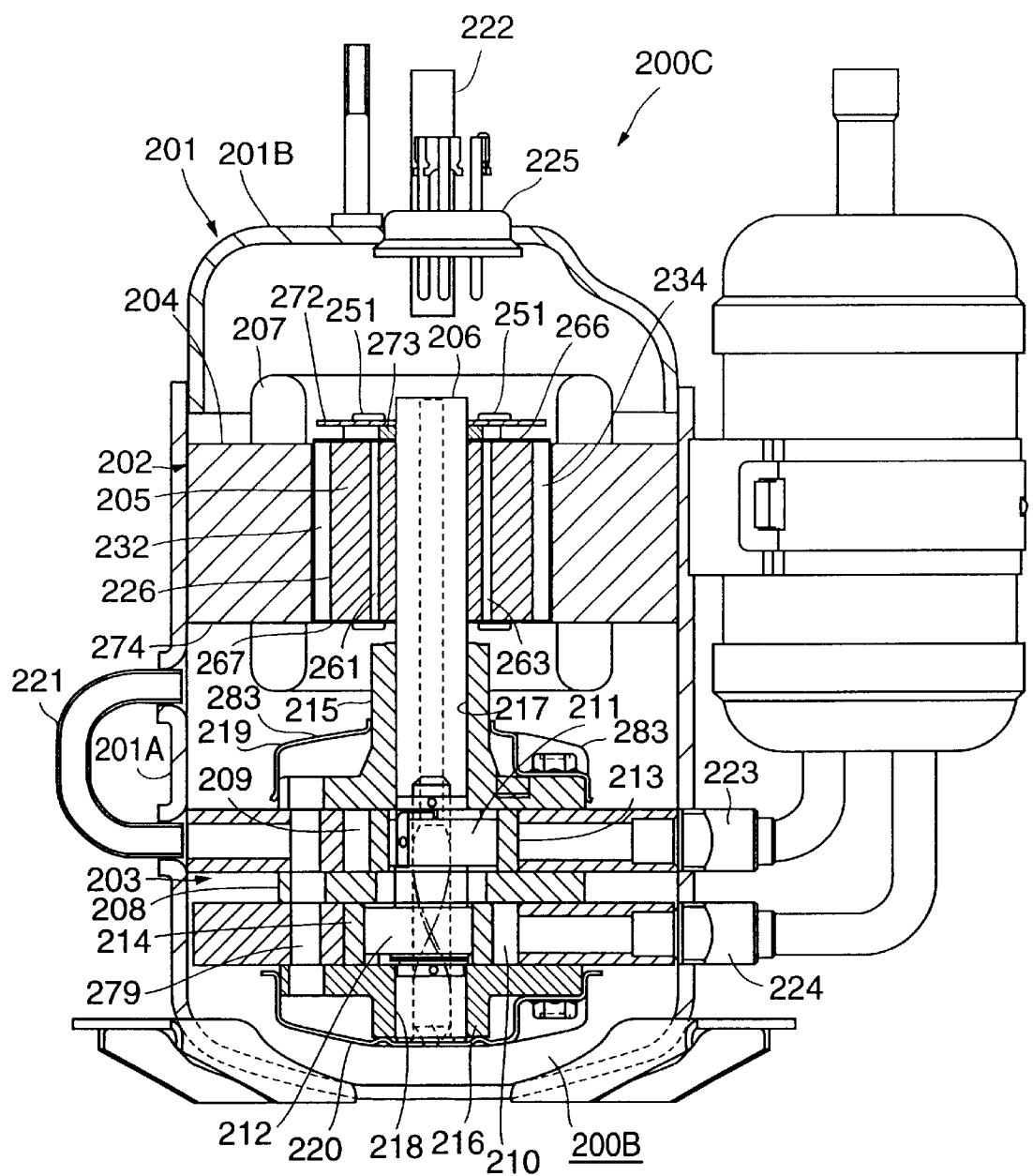
FIG. 17 is a longitudinal side sectional view of a closed rotary compressor according to a further embodiment of the present invention.

Description will now be given on the embodiment of the closed rotary compressor according to the present invention which can effectively realize reduction in noise of the closed rotary compressor with reference to FIGS. 17 to 24. FIG. 17 is a longitudinal side sectional view of the closed rotary compressor C to which the present invention is applied. In this drawing, reference numeral 201 denotes a cylindrical closed container in which the electric motor 202 is accommodated on the upper side as the electric element and the compression element 203 driven to rotate by the electric motor 202 is housed on the lower side. The closed container 201 has a half-split structure composed of a cylindrical shell portion 201A whose upper end is opened and an end cap portion 201B for closing the upper end opening of the shell portion 201A, and it is constituted by accommodating the electric motor 202 and the compression element 203 in the shell portion 201A and thereafter fitting the end cap portion 201B on the shell portion 201A to be sealed by high frequency deposition and the like. Further the bottom portion in the shell portion 201A of the closed container 201 serves as an oil bank 200B.

The electric motor 202 is a DC brushless motor adopting a so-called magnetic pole concentrated winding mode and made up of a stator 204 fixed on the inner wall of the closed container 201 and a rotor 205 which is fixed to a rotating shaft 206 extending in the axial direction of the cylinder of the closed container 201 and can rotate around the rotating shaft 206 on the inner side of the stator 204. The stator 204 is constituted by a stator core 274 formed by superimposing a plurality of substantially donut-like stator iron plates (silicon steel plates.) and a stator winding (driving coil) 207 for giving the rotating magnetic field to the rotor 205.

In such a case, six cog portions 275 are provided on the inner periphery of the stator core 274 and slot portions 278 opened inwardly and vertically are formed between the cog portions 275. Tip portions 275A which are opened along the outer surface of the rotor 205 are formed at the ends of the cog portions 275. Directly winding the stator winding 207 around the cog portions 275 by utilizing the space of the slot portions 278 forms magnetic poles of the stator 204 by the so-called concentrated direct winding so that the four-pole-and-six-slot stator 204 is configured.

Figure 18:
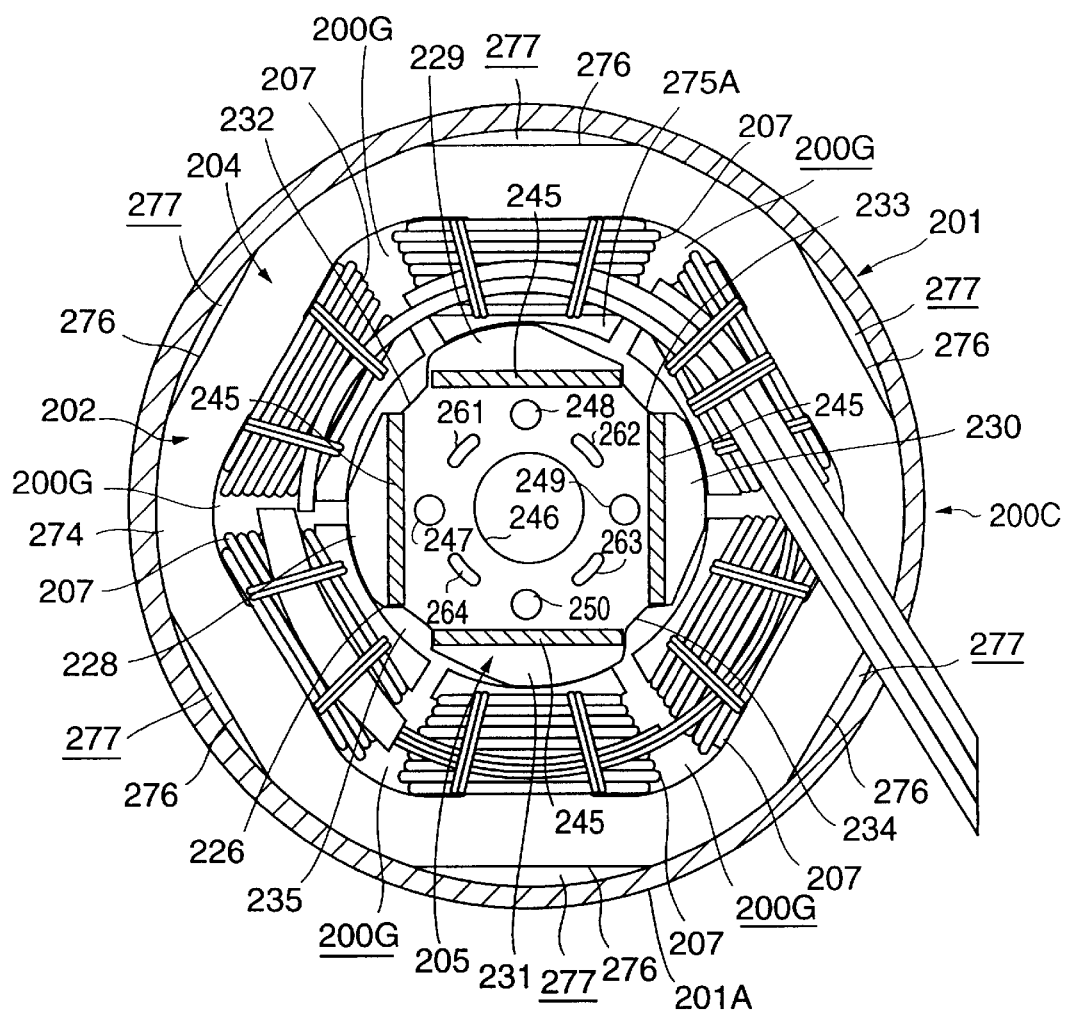
FIG. 18 is a plane cross section of the closed rotary compressor illustrated in FIG. 17.
Figure 19:
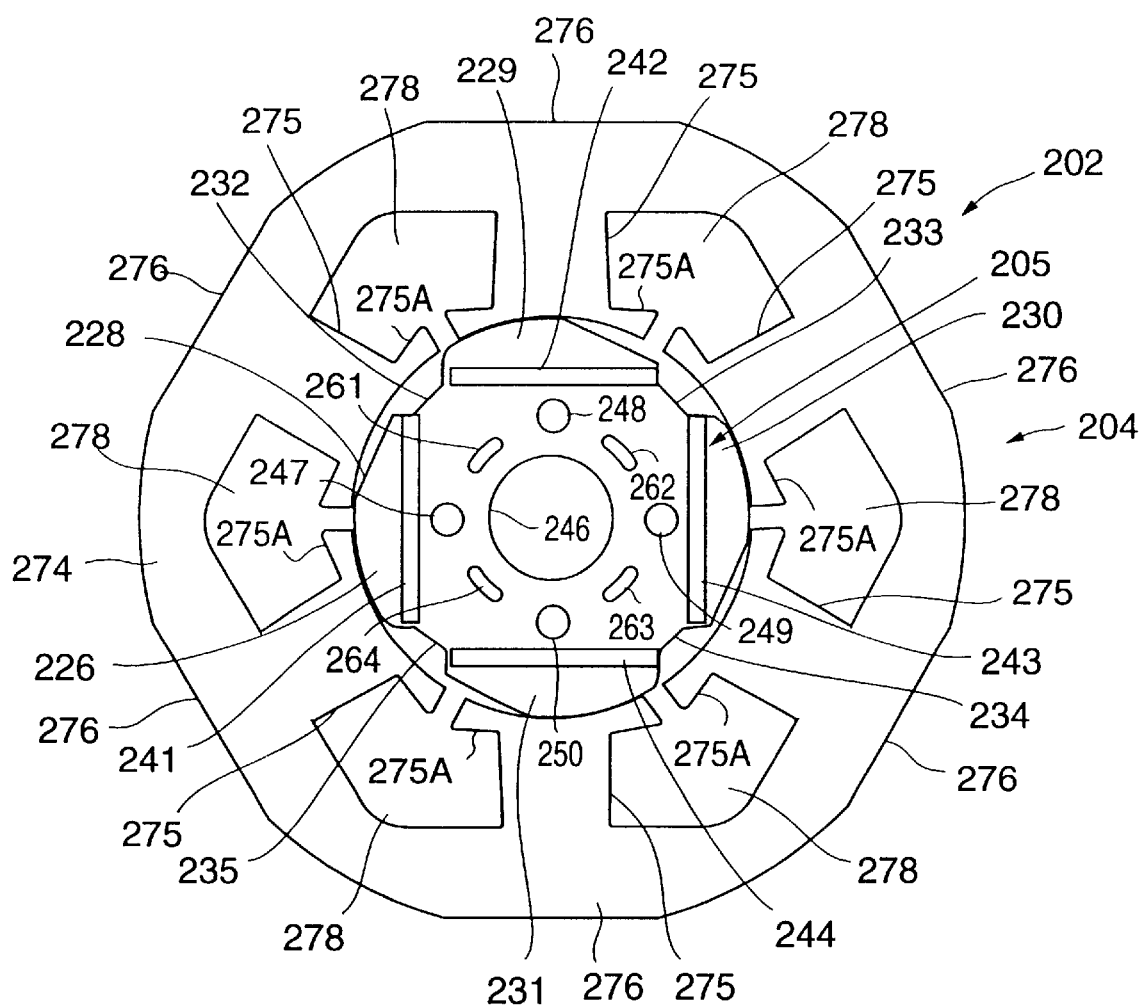
FIG. 19 is a plan view showing a stator core and a rotator core of the closed rotary compressor depicted in FIG. 17.

By adopting the magnetic concentrated winding type DC brushless motor as the electric motor 202, the dimension of the stator winding 207 which projects from the stator core 274 in the vertical direction can be greatly reduced as compared with the prior art (FIGS. 14 and 15). In addition, as shown in FIG. 19, since the cross sectional area of the slot portion 278 of the stator core is also increased as shown in FIG. 19, a gap 200G which is formed in the stator 204 and pierces in the vertical direction as shown in FIG. 18 can be also considerably enlarged as compared with the prior art (FIG. 15).

The outer peripheral surface of the stator core 274 is in contact with and fixed to the inner wall of the shell portion 201A of the closed container 201. In this case, a plurality of notches 276 (six positions in the embodiment) obtained by carving the circumference in the chord-like shape are formed on the outer peripheral surface of the stator core 274, and the notches 276 are estranged from the inner wall of the shell portion 201A to constitute an oil return passage 277 which will be described later.

On the other hand, the rotary compression element 203 is provided with a first rotary cylinder 209 and a second rotary cylinder 210 divided by an intermediate partition plate 208. Eccentric portions 211 and 212 driven to rotate by the rotating shaft 206 are attached to the respective cylinders 209 and 210, and phases at eccentric positions of these eccentric portions 211 and 212 are shifted from each other 180 degrees.

Reference numerals 213 and 214 denote a first roller and a second roller which rotate in the respective cylinders 209 and 210. These rollers turn in the cylinders 209 and 210 by rotation of the eccentric portions 211 and 212. Reference numerals 215 and 216 designate a first bearing and a second bearing. The first bearing 215 forms a closed compression space of the cylinder 209 between itself and the intermediate partition plate 208 and the second bearing 216 similarly forms a closed compression space of the cylinder 210 between itself and the intermediate partition plate 208. The first bearing 215 and the second bearing 216 have bearing portions 217 and 218 which rotatably pivot the lower portion of the rotating shaft 206, respectively.

Reference numerals 219 and 220 represent cup mufflers which are attached so as to cover the first bearing 215 and the second bearing 216, respectively. It is to be noted that the cylinder 209 communicates with the cup muffler 219 through a non-illustrated communication hole provided to the first bearing 215, and the cylinder 210 also communicates with the cup muffler 220 via a non-illustrated communication hole provided to the second bearing 216. The inside of the upper cup muffler 220 communicates with the upper cup muffler 219 through a through hole 279 piercing the cylinder 209 and 210 and the intermediate partition plate 208.

Figure 23:
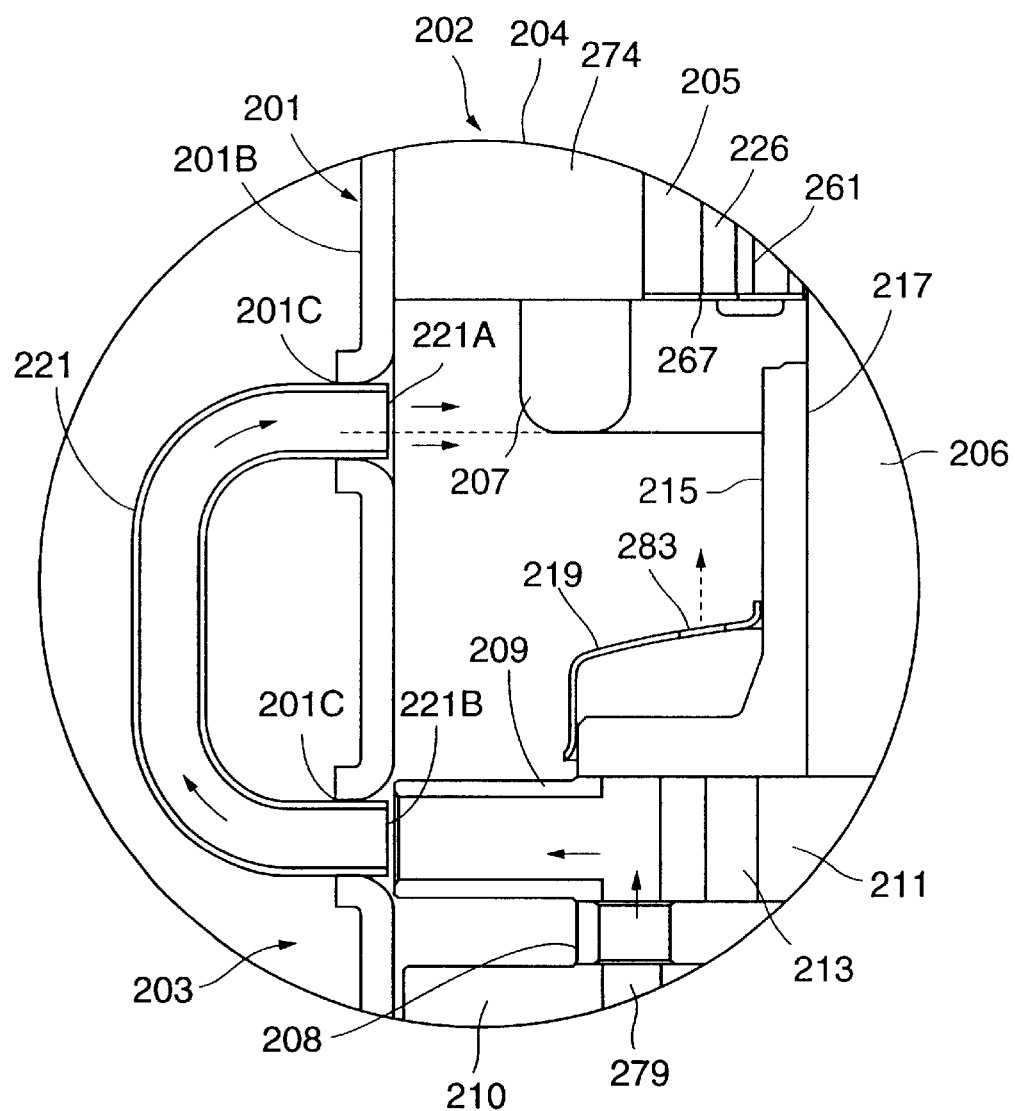
FIG. 23 is an enlarged longitudinal side sectional view showing a bypass tube part of the closed rotary compressor illustrated in FIG. 17.

Moreover, openings 201C and 201C are formed on the side wall of the shell portion 201A on the side of the cylinder 209 and on the side wall of the shell portion 201A on the side of the lower end of the stator winding 207 as shown in FIG. 23. An upper end opening 221A and a lower end opening 221B of the bypass pipe 221 are inserted-into the openings 201C from the outer side of the closed container 201 and welded and fixed to the shell portion 201A.

The lower end opening 221B of the bypass pipe 221 communicates with the inside of the cup muffler 220 through the through hole 279 in the cylinder 209, and the lower end of the upper end opening 221A is positioned below the lower end surface of the stator winding 207 of the stator 204. Incidentally, it is more desirable that the upper end opening 221A is formed on the side completely below the stator winding 207 within the allowance for the bend radius of the bypass tube 221.

Reference numeral 222 designates a discharge pipe provided above the closed container 201, and reference numerals 223 and 224 represent suction pipes connected to the cylinders 209 and 210, respectively. Further, reference numeral 225 denotes a closed terminal which supplies power from the outside of the closed container 201 to the stator winding 207 of the stator 204 (a lead wire connecting the closed terminal 225 to the stator winding 207 is not shown).

Reference numeral 226 represents a rotator core of the rotator 205. This is obtained by superimposing a plurality of rotator iron plates punched out from an electromagnetic steel plate having a thickness of 0.3 mm to 0.7 mm in a form such as shown in FIGS. 18 and 19 and caulking them to be integrally layered.

In this case, the rotator iron plate of the rotator core 226 is punched out from the electromagnetic steel plate so that salient pole portions 228 to 231 constituting four magnetic poles are formed, and reference numerals 232 to 235 denote concave portions provided in such a manner that salient pole portions are formed between the respective salient pole potions 228 to 231.

Reference numerals 241 to 244 designate slots for pressing a magnetic body 245 (a permanent magnet) therein. They correspond to the respective salient pole portions 228 and 231 are formed on a concentric circuit on the outer peripheral side of the rotary core 226 along the axial direction of the rotating shaft 206.

Further, reference numeral 246 denotes a hole which is formed at the center of the rotator core 226 and in which the rotating shaft 206 is shrinkage-fitted. Reference numerals 247 to 250 represent through holes having the size and shape allowing insertion of later-described rivets 251 for caulking. These holes are formed in accordance with the inner side of the respective slots 241 to 244. Furthermore, reference numerals 261 to 264 designate air holes for forming oil passages provided between the respective through holes 247 to 250. The respective rotator iron plates are superimposed and then caulked each other to be integrated, thereby forming the rotator core 226.

On the other hand, the magnetic body 245 is constituted by a rare earth magnet material such as a praseodymium based magnet or a neodymium based magnet whose surface is nickel-plated and the outward form thereof is rectangular as a whole with a rectangular cross section. The respective slots 241 to 244 have the size allowing the insertion of the magnetic body 245.

Figure 21:
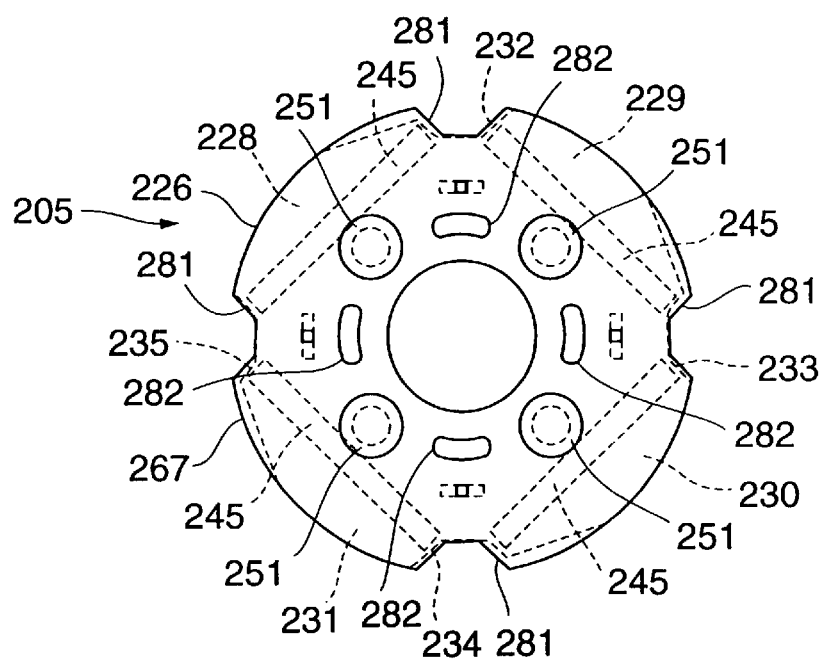
FIG. 21 is a bottom view showing the rotator of the closed rotary compressor depicted in FIG. 17.

Reference numerals 266 and 267 denote tabular edge members attached the upper and lower ends of the rotator core 226, which are constituted by a plate member of a non-magnetic material such as aluminium or a resin material. To these members 266 and 267 are formed notches 281 at positions corresponding to the concave portions 232 to 235 and are formed similar air holes 282 at positions corresponding to the air holes 261 to 264 so that they have substantially the same shape as the stator core 226 (FIG. 21).

Through holes are formed to the edge members 266 and 267 at positions corresponding to the through holes 247 to 250.

Figure 20:
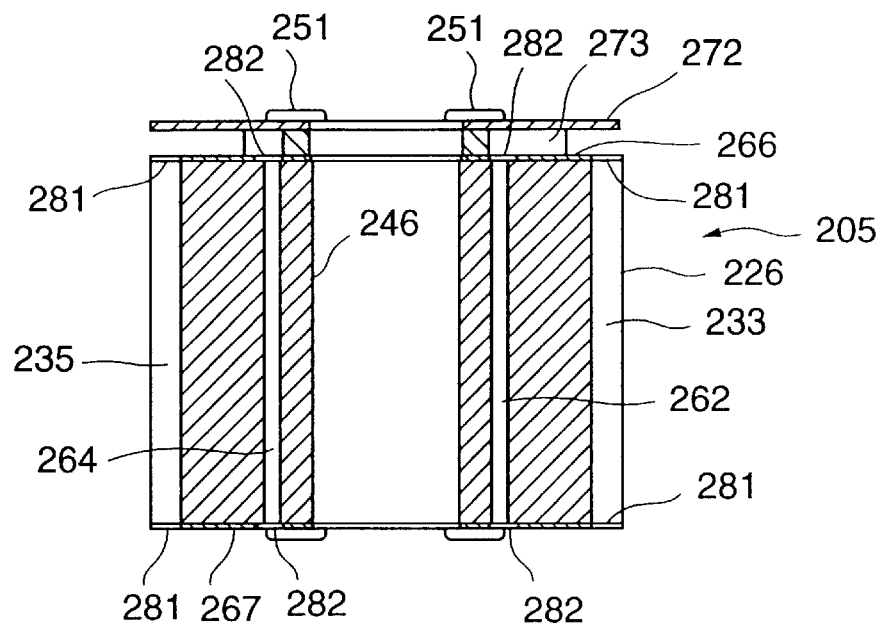
FIG. 20 is a longitudinal side sectional view of a rotator of the closed rotary compressor depicted in FIG. 17.
Figure 22:
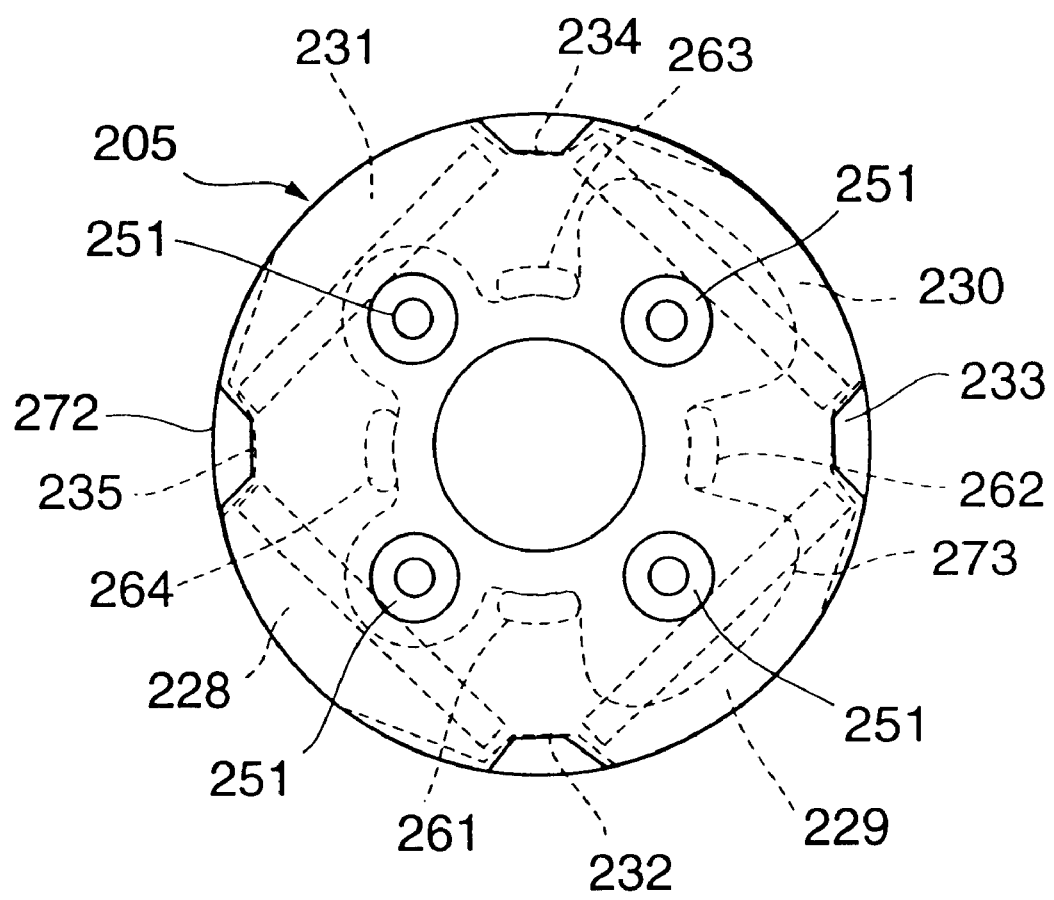
FIG. 22 is a top view showing the rotator of the closed rotary compressor illustrated in FIG. 17.

It is to be noted that reference numeral 272 designates a discoid oil separation plate attached to the rotator 205 at a position above the edge member 266, and 273, a balance weight provided between the plate 272 and the edge member 266 (see FIGS. 20 and 22).

With the above-described structure, when the stator winding 207 of the stator 204 of the electric motor 202 is energized, a rotating electric field is formed to cause the rotator 205 to rotate. Rotation of the rotator 205 causes eccentric rotation of the rollers 213 and 214 in the cylinders 209 and 210 through the rotating shaft 206, and the intake gas absorbed from the suction pipes 223 and 224 is compressed.

The compressed high pressure gas is emitted from the upper cylinder 209 into the cup muffler 219 through the communication hole and further discharged from the discharge holes 283 formed to the cup muffler 219 into the upper (a direction of the electric motor 4) closed container 201 (indicated by a broken arrow in FIG. 23). On the other hand, the gas is emitted from the cylinder 210 into the cup muffler 220 through the communication hole and passes through the through hole 279. The gas then partially enters the cup muffler 219 to be discharged from the discharge holes 283, but the remaining part of the gas enters from the lower end opening 221B into the bypass pipe 221 to be discharged from the upper end opening 221A into the space on the lower side of the electric motor 202 (the compression element 203) in a radial direction of the cylinder of the closed container 201.

At this time, since at least the half part of the upper end opening 221 of the bypass pipe 221 is formed below the stator winding 207, the gas discharged from the upper end opening 221A directly collides with the stationary wave which is about to be generated in the space on the lower side of the electric motor 202.

This can effectively burst the circumferential stationary wave generated in the space within the closed container 201 between the electric motor 202 and the rotary compression element 203, thereby preventing the columnar resonance to be excited. Therefore, decrease in the low frequency noise produced due to excitation of the columnar resonance can be achieved and the significant reduction in noise of the closed rotary compressor C can be realized.

It is to be noted that the gas discharged from the cylinder 210 is led to both the cup muffler 219 and the bypass tube 221, but the present invention is not restricted thereto and the gas may be led to only the bypass pipe 221.

In addition, the gas discharged in the closed container 201 passes each passage in the electric motor 202 to be emitted from the discharge pipe 222 to the outside. Moreover, the oil is separated by the plate 272 and fed back to the oil bank 200B through the passage 277.

According to the present invention described above in detail, in the closed rotary compressor for accommodating the electric element and the rotary compression element in the closed container, the rotary compression element comprising: the intermediate partition plate; the first and second cylinders provided on both sides of the intermediate partition plate; the rotating shaft having the eccentric portions whose rotating angles shifted from each other 180 degrees and extending in the axial direction of the closed container to be connected with the electric element; the rollers respectively fitted to the eccentric portions of the rotating shaft to rotate in the cylinders; and the bearings for closing the respective openings of the cylinders, the electric element comprising: the stator having the stator winding and being fixed to the closed container; and the rotor being supported by the rotating shaft and capable of rotating on the inner side of the stator, the gas emitted from the first cylinder is discharged toward the electric element and the gas emitted from the second cylinder is discharged from the circumferential direction of the closed container into the space between the stator winding and the rotary compression element. Therefore, the stationary wave in the circumferential direction which is generated in the space within the closed container between the electric element and the rotary compression element can be burst by the gas discharged from the second cylinder, thereby avoiding the excitation of the columnar resonance.

Consequently, decrease in the low frequency sound caused due to the excitation of the columnar resonance can be attained and the significant reduction in the noise of the compressor can be realized. In particular, when the bypass pipe for leading the gas discharged from the second cylinder is attached to the outside of the closed container as in the present invention defined in claim 2, the gas discharged from the second cylinder can be emitted between the electric element and the rotary compression element from the circumferential direction. In addition, when the electric element is constituted by the motor of the magnetic pole concentrated winding type, since the projection dimension of the stator winding from the stator core can be decreased, the gas from the second cylinder can be assuredly caused to collide with the stationary wave in the circumferential direction with the bend radius which is allowed by the bypass pipe, thus effectively avoiding the excitation of the columnar resonance. Further, the overall size of the closed rotary compressor can be also reduced by adopting such a motor.

What is claimed is:

1. A closed rotary compressor comprising:

a closed container;

an electric element and a rotary compression element driven by a rotating shaft connected to said electric element in said closed container;

said electric element formed by a motor adopting a magnetic pole concentrated winding mode and comprising:

a stator fixed to an inner wall of said closed container;

a rotator rotatably supported by said rotating shaft on the inner side of said stator;

a stator core constituting said stator and having a plurality of cog portions and slot portions formed on said stator core; and a stator winding wound directly around each of said cog portions using a said cog portion as the form and support for the winding and said slot portions on each side of a respective cog portion.

2. The closed rotary compressor according to claim 1 wherein said rotary compression element is housed in a bottom portion within said closed container and said electric element is arranged above said rotary compression element; and further comprising a gas discharge pipe attached on the upper wall of said closed container above said electric element.

3. The closed rotary compressor according to claim 2 wherein said closed container includes a shell portion which has one end accommodating said electric element and said rotary compression element being opened, and further comprising an end cap portion for closing said opening of said shell portion.

4. A closed rotary compressor comprising:

a closed container;

an electric element and a rotary compression element driven by a rotating shaft connected to said electric element in said closed container;

said electric element formed by a motor adopting a magnetic pole concentrated winding mode and comprising:

a stator fixed to an inner wall of said closed container, a rotator rotatably supported by said rotating shaft on the inner side of said stator, a stator core constituting said stator, a plurality of cog portions and slot portions formed to said stator core, and a stator winding directly wound around each of said cog portions utilizing said slot portions, wherein when said rotary compression element is housed in a bottom portion within said closed container and said electric element is arranged above said rotary compression element;

discharge pipes attached on the upper wall of said closed container; a distance from the upper end of said stator winding of said electric element to the lower surface of the upper wall of said closed container is L1; and a vertical dimension of said stator winding of said electric element is L2, and setting is made within a range of $0.3 \leq L1/(L1+L2) \leq 0.6$.

5. A closed rotary compressor according to claim 4, wherein said rotator comprises: a rotator core; concave portions formed across the outer peripheral surface of said rotator core in the vertical direction; and edge members attached to upper and lower end surfaces of said rotator core with notch portions formed to said edge members at positions corresponding to said concave portions of said rotator core.

6. A closed rotary compressor according to claim 4 or claim 5, further comprising discharge holes formed in a cup muffler of said rotary compression element, through holes extending to upper and lower ends of said rotator formed at positions corresponding to the upper parts of said discharge holes of said rotator.

7. A closed rotary compressor according to claim 6, wherein a plurality of concave passages extending to said upper and lower ends are formed on the outer peripheral surface of said stator at predetermined intervals, a cross sectional form of each passage formed to be narrow on the outer peripheral side of said stator and wide on the inner side, the outer peripheral surface of a part other than each passage being in contact with the inner wall of said closed container.

8. A closed rotary compressor comprising:

a closed container;

an electric element and a rotary compression element driven by a rotating shaft connected to said electric element in said closed container;

said electric element formed by a motor adopting a magnetic pole concentrated winding mode and comprising:
- a stator fixed to an inner wall of said closed container,
- a rotator rotatably supported by said rotating shaft on the inner side of said stator,
- a stator core constituting said stator,
- a plurality of cog portions and slot portions formed to said stator core, and
- a stator winding directly wound around each of said cog portions utilizing said slot portions, wherein said closed container includes a shell portion which has one end accommodating said electric element and said rotary compression element being opened and an end cap portion for closing said opening of said shell portion, and assuming that a volume thickness of said stator core of said stator of said electric element is SH and a distance from said stator core to the edge of said end cap is T, and setting is made within a range of $0.15 < T/SH < 0.5$.

9. A closed rotary compressor comprising:

a closed container;

an electric element and a rotary compression element driven by a rotating shaft connected to said electric element in said closed container;

said electric element formed by a motor adopting a magnetic pole concentrated winding mode and comprising:
- a stator fixed to an inner wall of said closed container,
- a rotator rotatably supported by said rotating shaft on the inner side of said stator,
- a stator core constituting said stator and having a plurality of cog portions and slot portions formed on said stator core, and
- a stator winding wound directly around each of said cog portions using a said cog portion as the form and support for the winding and utilizing said slot portions on each side of a respective cog portion, wherein a passage area in said stator is set to be not less than 3.8% of an inside cross sectional area of said closed container.

10. The closed rotary compressor according to claim 9, wherein an area of a gap in said stator is set to be larger than an area of a passage between said stator and said closed container.

11. A closed rotary compressor comprising:

a closed container;

an electric element and a rotary compression element in said closed container, said rotary compression element comprising;
- an intermediate partition plate,
- first and second cylinders respectively provided on opposite sides of said intermediate partition plate,
- a rotating shaft having one end connected to said electric element and eccentric portions at the other end of said shaft whose rotation angles are shifted from each other 180 degrees and which shaft extend in the axial direction of said closed container,
- rollers respectively fitted to said eccentric portions of said rotating shaft to rotate in said cylinders, and
- bearings for closing respective openings of said cylinders, said electric element formed by a motor having a magnetic pole concentrated winding mode and comprising;
- a stator core fixed to an inner wall of said closed container,
- a rotor rotatably supported by said rotating shaft and rotatable on the inner side of said stator,
- a plurality of cog portions and slot portions formed on said stator core, and
- a stator winding directly wound around each of said cog portions utilizing said slot portions, and
- a space between said stator winding and said rotary compression element into which gas emitted from said first cylinder is discharged toward said electric element, and gas emitted from said second cylinder is discharged in the radial direction of said closed container.

12. The closed rotary compressor according to claim 11, further comprising a bypass pipe located outside of said closed container for guiding said gas emitted from said second cylinder.

* * * * *